United States Patent
Bailey

(10) Patent No.: US 6,701,513 B1
(45) Date of Patent: Mar. 2, 2004

(54) PROGRAM-DEVELOPMENT ENVIRONMENT FOR USE IN GENERATING APPLICATION PROGRAMS

(75) Inventor: Bendrix L. Bailey, Rochester, MA (US)

(73) Assignee: Measurement Computing Corporation, Middleboro, MA (US)

( * ) Notice: Subject to any disclaimer, the term of this patent is extended or adjusted under 35 U.S.C. 154(b) by 0 days.

(21) Appl. No.: 09/483,123

(22) Filed: Jan. 14, 2000

(51) Int. Cl.$^7$ ................................................ G06F 9/44
(52) U.S. Cl. ...................... 717/109; 717/105; 717/106; 717/107; 717/108; 719/318; 345/967
(58) Field of Search ............................... 717/105–109; 719/318; 345/967

(56) References Cited

U.S. PATENT DOCUMENTS

| | | |
|---|---|---|
| 4,315,315 A | 2/1982 | Kossiakoff |
| 4,901,221 A | 2/1990 | Kodosky et al. |
| 4,914,568 A | 4/1990 | Kodosky et al. |
| 5,155,836 A | 10/1992 | Jordan et al. |
| 5,261,043 A | 11/1993 | Wolber et al. |
| 5,291,587 A | 3/1994 | Kodosky et al. |
| 5,301,336 A | 4/1994 | Kodosky et al. |
| 5,313,574 A | 5/1994 | Beethe |
| 5,313,575 A | 5/1994 | Beethe |
| 5,481,668 A | 1/1996 | Marcus |
| 5,481,741 A | 1/1996 | McKaskle et al. |
| 5,490,246 A | 2/1996 | Brotsky et al. |
| 5,497,500 A | 3/1996 | Rogers et al. |
| 5,610,828 A | 3/1997 | Kodosky et al. |
| 5,694,539 A | 12/1997 | Haley et al. |
| 5,717,614 A * | 2/1998 | Shah et al. .................. 702/119 |
| 5,724,589 A * | 3/1998 | Wold ........................... 709/318 |
| 5,737,622 A | 4/1998 | Rogers et al. |
| 5,842,020 A | 11/1998 | Faustini |
| 5,847,953 A | 12/1998 | Sojoodi et al. |
| 5,862,379 A * | 1/1999 | Rubin et al. ................. 717/109 |

(List continued on next page.)

OTHER PUBLICATIONS

Grundy, J.C., Mugridge, W.B., Hosking, J.G., "Visual Specification of Multi–View Visual Environments", 1998 IEEE, retrieved from CiteSeer, May 12, 2003.*

Zhang, Kang, Hintz, Tom and Ma, Xianwu, "The Role of Graphics in Paralled Program Development", 1999 Academic Press, p 215–243, retrieved from google.com, May 12, 2003.*

Helsel, Robert, Visual Programing with HP VEE, (c) 1998 (Prentice Hall), pp. Table of Contents, preface–1 to preface–6, 1–1 to 1–38, 2–25 to 2–27, and 7–1 to 7–16.

(List continued on next page.)

Primary Examiner—Tuan Dam
Assistant Examiner—Mary Steelman
(74) Attorney, Agent, or Firm—Cesari and McKenna, LLP

(57) ABSTRACT

The present invention relates to a program-development environment that allows developers to seamlessly switch between a visual programming paradigm and a textual programming paradigm, thereby permitting developers to choose the paradigm best suited for creating each aspect of the desired program. A graphical user interface (GUI) may be generated by the program-development environment, and displayed on the screen of a computer system. The GUI has several elements including a form window and a designer window. The form window is configured to receive one or more control objects selected by the developer, and the designer window is configured to display a symbolic representation of those control objects placed in the form window. According to the invention, these symbols can be linked together by the developer in the form of a data flow or block diagram that logically represents the flow of data and control information into, out of, and between the selected control objects, and that corresponds to the application program being generated. In response to such graphical inputs, the program-development environment generates event handler procedures or code for use with the application program being developed. The program-development environment additionally affords the developer, preferably through the use of a selectively displayable code window, the ability to provide or modify event handlers textually.

6 Claims, 25 Drawing Sheets

U.S. PATENT DOCUMENTS

| | | | |
|---|---|---|---|
| 5,870,088 A | 2/1999 | Washington et al. | |
| 5,883,639 A | 3/1999 | Walton et al. | |
| 6,064,816 A | 5/2000 | Parthasarathy et al. | |
| 6,154,876 A | 11/2000 | Haley et al. | |
| 6,189,138 B1 | 2/2001 | Fowlow et al. | |
| 6,226,787 B1 | 5/2001 | Serra et al. | |
| 6,233,726 B1 * | 5/2001 | Bowman et al. | 717/107 |
| 6,282,699 B1 * | 8/2001 | Zhang et al. | 717/109 |
| 6,425,120 B1 * | 7/2002 | Morganelli et al. | 717/109 |
| 6,438,742 B1 * | 8/2002 | McCann et al. | 717/109 |

OTHER PUBLICATIONS

Sokoloff, Leonard, Basic Concepts of LabView 4, (c) 1998 (Prentice Hall), pp. Table of Contents, 10–63, 95–109, 357–426.

Appleman, Dan, Dan Appleman's Developing COM/Activex Components with Visual Basic 6, (c)1999 (SAMS), pp. Table of Contents, 21–66, 469–511, 264–285.

Jacon, Robert J. K., A State Transition Diagram Language for Visual Programming, Aug. 1985 (IEEE), pp. 51–59.

Moriconi, Mark and Hare, Dwight F., Visualizing Program Designs through Pegasys, IEEE Computer,, (c) 1985, pp. 72–85.

Reiss, S., Graphical Program Development with PECAN Program Development Systems, (c) 1984, pp. 30–41 and iii.

Matwin, S. and Pietrzykowski, Prograph: A Preliminary Report, Comput. Lang. vol. 10 No. 2, (c) 1985, pp. 91–126.

Pietrzykowski, T., Matwin, S. and Muldner, T., Programming Language Prograph: Yet Another Application of Graphics, (c) 1983, pp. 143–145.

Sutherland, W. R., On–Line Graphical Specification of Computer Procedures, Technical Report 405, May 23, 1996, pp. iii–iv and 1–31.

Koelma, D., Balen, R. and Smeulders, A., SCIL–VP: a multi–purpose visual programming environment, (c) 1992, pp. 1188–1198.

Kopache, M. and Glinert, E., C2: A Mixed Textual/Graphical Environment for C, (c) 1988, pp. 231–238.

Lecoliner, E., XXL: A Dual Approach for Building User Interface, (c) 1996, pp. 99–108.

Veire, F., Szmal, P. and Francik, J., Siamoa–A System for Visual Programming, Program Visualisation and Debugging, Proceedings of AVI'98–Advanced Visual Interfaces Conference, (c) 1998.

Burnett, Margaret M., Goldberg, Adele and Lewis, Ted G., Visual Object–Oriented Programming, (c) 1995, pp. Table of Contents, 10–19, 28, 38, 40–42.

Brogden, William B., Louie, Jeffrey A. and Tittel, ED, Visual for Java, (c0) 1998, pp. 5, 8–9, 13, 37, 56–59, 65, 82, 113, 140, 184.

* cited by examiner

PROGRAM-DEVELOPMENT ENVIRONMENT FOR USE IN GENERATING APPLICATION PROGRAMS

CROSS-REFERENCE TO RELATED APPLICATIONS

This application is related to the following co-pending U.S. Patent Applications:

U.S. patent application Ser. No. 09/483,123 entitled, A PROGRAM-DEVELOPMENT ENVIRONMENT FOR USE IN GENERATING APPLICATION PROGRAMS, filed Jan. 14, 2000;

U.S. patent application Ser. No. 09/483,760 entitled, METHOD AND APPARATUS FOR RESOLVING DIVERGENT PATHS IN GRAPHICAL PROGRAMMING ENVIRONMENTS, filed Jan. 14, 2000, now U.S. Pat. No. 6,425,121;

U.S. patent application Ser. No. 09/483,759 entitled METHOD AND APPARATUS FOR DETECTING AND RESOLVING CIRCULAR FLOW PATHS IN GRAPHICAL PROGRAMMING SYSTEMS, filed Jan. 14, 2000; and U.S. patent application Ser. No. 09/483,122 entitled, REPEATING PROGRAM OBJECT FOR USE WITH A GRAPHICAL PROGRAM-DEVELOPMENT SYSTEM, filed Jan. 14, 2000. now U.S. Pat. No. 6,425,120.

FIELD OF THE INVENTION

The present invention relates generally to the field of computer programming and, more specifically, to software development environments.

BACKGROUND OF THE INVENTION

To generate a software program that can be executed or run by a computer, a software developer or programmer typically chooses a programming language, such as BASIC (Beginner's All-purpose Symbolic Instruction Code), Fortran, C, etc., and writes source code using the keywords, syntax, variable names, data structures, etc. defined by the selected programming language. Each programming language typically defines its own unique syntax and keywords for performing various functions. After the source code has been written, it is typically converted by a compiler into a machine readable format that can be understood by the computer (e.g., object code). If the developer used incorrect keywords or syntax, the source code cannot by compiled successfully.

The source code is typically written with a text editor and organized into a series of lines of code. Although simple programs may only need a few lines of code, complex programs often consume hundreds, thousands or tens of thousands of lines of code. Significant portions of code, moreover, are often required just to generate displayable user interface images or forms, such as text boxes, command buttons, etc. that can be displayed by windows-based computer systems, such as personal computers running the Microsoft Windows® series of operating systems from Microsoft Corporation of Redmond, Wash. Furthermore, significant editing is often required to make even relatively minor adjustments to such user interface elements (e.g., moving, re-sizing, etc.).

In order to simplify the creation of such user interface images or forms, Microsoft developed and released a programming system known as Visual Basic®. Visual Basic includes a language engine for executing text-based programming statements, and a forms layout package having a plurality of objects or icons representing common user interface elements, such as text boxes, radio buttons, command buttons, scroll bars, etc. When a developer selects one of these objects from a tool palette and places it onto a form window, Visual Basic automatically creates corresponding code to support that object. By eliminating the need to write code just to display conventional interface elements, Visual Basic greatly simplified the creation of programs to be run on Windows-based platforms. These objects are typically stored in one or more dynamic link libraries (DLLs) that are loaded and run as necessary at application run-time. Since Visual Basic is an "open" programming languages, meaning that its syntax and command structures are known and available, third-parties have created and marketed a whole range of objects that can be added to a Visual Basic forms window to facilitate the creation of all sorts of different application programs.

With the release of Visual Basic 4.0, Microsoft extended Visual Basic to support software constructs that have certain object-oriented features by basing this release on its Component Object Model (COM). With Visual Basic 4.0, a new type of object, often referred to as a COM or ActiveX control or object was defined. A COM or ActiveX control is basically a component program object based on Microsoft's COM technologies, which can issue or raise events. With Visual Basic 4.0 and later releases, a developer similarly uses a forms layout package to drag and drop one or more ActiveX controls onto a form window. In addition, by double-clicking an ActiveX control on the form window, a code window is displayed. Inside this code window, the developer may insert text-based programming code to handle the events raised by the respective ActiveX control (i.e., an event handler). This code must comply with the syntactical and keyword constraints defined by Visual Basic in order for it to be properly executed at application run-time. By writing these event handlers, a developer can cause various ActiveX controls to share information and otherwise interact with each other greatly facilitating the creation of application programs.

FIG. 1 illustrates a conventional Visual Basic work space 100 that may be displayed on a computer screen. The work space 100 includes a Form window 102 and a tool palette 104. The tool palette 104 contains a plurality of icons, which represent individual controls, including a vertical scroll control 106 and a text label control 108, among others. A developer may select any of the controls contained on palette 104 to cause the selected control to appear on the Form window 102. By selecting the vertical scroll icon 106, for example, a corresponding vertical scroll image 110 is displayed on the Form window 102. A text label image 112 may be placed on the Form window 102 in a similar manner. At this point, however, there is no inter-relationship between the objects corresponding to vertical scroll image 110 and text label image 112. In order to establish some such relationship (e.g., causing the text label to display the current position of the vertical scroll), the developer must write a subroutine (e.g., an event handler). Each line or statement of the subroutine, moreover, must conform to the syntax and keyword commands of the underlying programming language (e.g., Visual Basic). Specifically, the developer selects the vertical scroll 110, thereby causing a code window 114 to be displayed on screen 100. Inside the code window 114 the developer writes a text-based subroutine 116 that causes the output of the vertical scroll 110 to be displayed in the text label 112.

When this program is subsequently run, images for the vertical scroll bar 110 and the text label 112 will appear on the screen of the user as part of a user interface. The text label 112, moreover, will display the position of the vertical scroll bar 110 (e.g., "2256"). If the user moves the slider bar of the vertical scroll, the contents of text label change to display the scroll bar's new position (e.g., "3891"). As shown, with Visual Basic, the developer need not "write" any code to cause the vertical scroll bar image 110 or the text label image 112 to be displayed on the computer screen during run time. In addition, during the programming phase, the developer may move and re-size these user interface elements simply by manipulating their appearance on the Form window 102 (e.g., with a mouse) in a conventional manner. Due to the relative ease with which application programs having user interface elements can be created, Visual Basic has become a highly popular programming tool. However, in order to develop a meaningful application program (i.e., one in which there is some inter-relationship between the user interface elements), the developer must write, in a text-based format, one or more subroutines. Thus, the developer must learn and is limited by the syntax and keyword structures of Visual Basic.

In addition to Visual Basic and its related products (e.g., Visual C++, etc.), several companies have created software development tools that are almost entirely visually oriented. That is, using these tools, a developer can create an executable application program without having to write a single line of text-based code. For example, National Instruments Corporation of Austin, Tex. has created a programming tool called Lab-VIEW™ for creating virtual instruments primarily for use in the instrumentation industry. Hewlett Packard Company of Palo Alto, Calif. has similarly created a programming tool called HP VEE for generating software programs for use in the electronic testing and data acquisition industries.

HP VEE provides a work area in which a developer can create a data flow diagram. The developer typically selects the objects for inclusion in his or her program from a pull-down menu. HP VEE provides a fixed number of these objects which have been tailored to provide functionality commonly used in the data acquisition industry. The developer may then "draw" data lines between these objects in the work area. In response to drawing these lines, HP VEE creates program steps that transfer data or other information between the respective objects. The developer must perform all of this graphically within the work area.

For developers working in the data acquisition field, HP VEE is a useful programming tool. There are some disadvantages nonetheless. For example, to implement functionality that the pre-defined objects do not provide, the developer must typically create a completely new object. Since this can take a significant amount time, it is often not done, unless the desired functionality is critical to the application program. Accordingly, some application programs lack functionality that the developer would have preferred to include. In addition, a graphical approach is not always the most expeditious way to represent or implement certain programs or subroutines.

SUMMARY OF THE INVENTION

The present invention recognizes that graphical programming methods inherently impose constraints on the creation of software programs by fixing the set of options that are available to the developer. For example, if the graphical programming method lacks a pre-defined solution for some desired functionality, then that functionality either cannot be implemented or its implementation would require such effort as to render the graphical programming method impractical as a programming tool. To solve this problem, the present invention is directed to a program-development environment that allows developers to seamlessly switch between a graphical programming paradigm and a textual programming paradigm. The developer can thus choose the particular paradigm best suited for creating each aspect of the desired program.

The program-development environment of the present invention generates a graphical user interface (GUI) that may be displayed on the screen of a computer system. The GUI has several elements including a form window and a designer window having a toolbar identifying a plurality of available control objects. The control objects are basically software modules having pre-defined properties, methods and events that are configured to perform some useful function. The form window is configured to receive instantiations of one or more control objects selected by the developer from the toolbar, and the designer window is configured to display a symbolic representation of those control objects residing in the form window. According to the invention, these symbols can be linked together by the developer in the form of a data flow or block diagram that logically represents the flow of data and control information into, out of, and between the selected control objects. The flow diagram logically corresponds to the application program being generated.

Specifically, the development environment includes a displayable wire construct that may be used by the developer to graphically link the symbolic representations of the control objects appearing in the designer window. These symbols, moreover, include one or more terminals each of which is associated with pre-defined properties, methods or events of the corresponding control in the form window. Preferably, the developer connects one end of the wire construct to a terminal of a first control object symbol (referred to as the "source" control) and the second end to the terminal of a second control object symbol (referred to as the "sink" control). The selected terminal of the source control is associated with an event of the source control and often, but not always, a source control property, and the selected terminal of the sink control is preferably associated with at least a property of the sink control. In response to linking the two control object symbols with the wire construct, the development environment generates a corresponding event handler within the software program. This event handler is called during run time whenever the source event occurs, and it involves affecting the specified sink object's property in some manner.

The development environment further includes means for calling-up a code window in which the developer may write event handler procedures or code (e.g., a subroutine procedure) using textual inputs for any of the control objects or wire constructs placed on the form window and appearing in the designer window. The development environment inserts all such textual code-based event handlers into the same program as the event handlers generated in response to the graphical input. Thus, the software program generated by the software development environment of the present invention contains event handlers based on the textual code written by the developer as well as event handlers created solely by graphically linking control object symbols with the displayable wire construct. Accordingly, developers can switch back and forth between highly flexible textual code-based event handlers and easy-to-use "graphical" event handlers during programming.

The wire construct of the present invention also includes several novel features. Specifically, the wire construct itself has a plurality of properties, methods and events. Wire properties, moreover, are set to default values by the program-development environment in order to implement desired event handling characteristics. Nonetheless, the developer, at any time during program development, may direct the system to display the properties associated with a selected wire construct. The developer may then change the values of these wire properties as desired. In response, the program-development environment modifies the software program accordingly. Furthermore, using the code window, the developer may write one or more text-based event handlers or subroutine procedures that are responsive to the events raised by a selected wire construct. Such event handlers or subroutine procedures are also incorporated as part of the software program for execution during run time.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
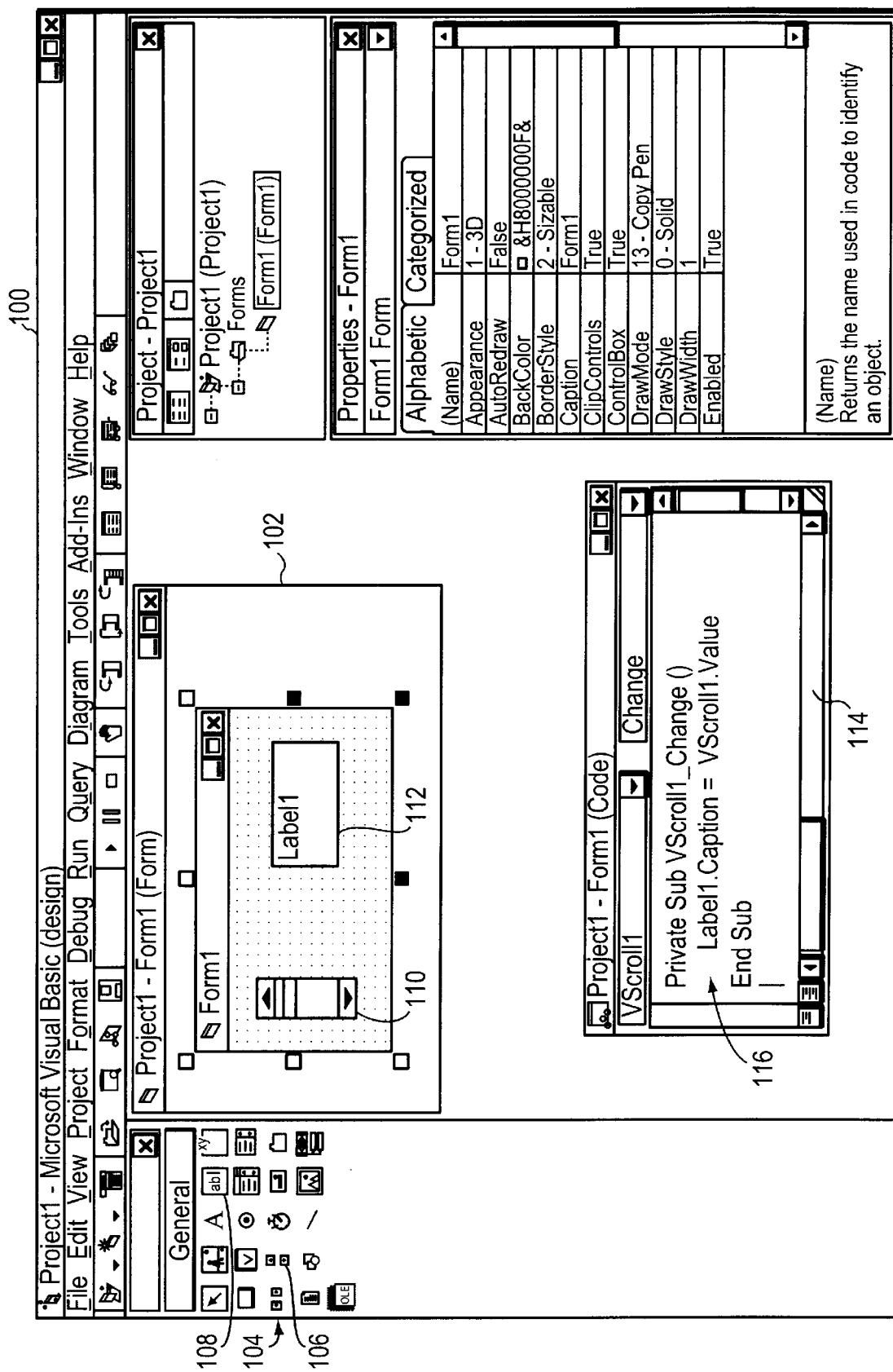
FIG. 1, previously discussed, is a highly schematic illustration of a conventional visual programming environment.
Figure 2:
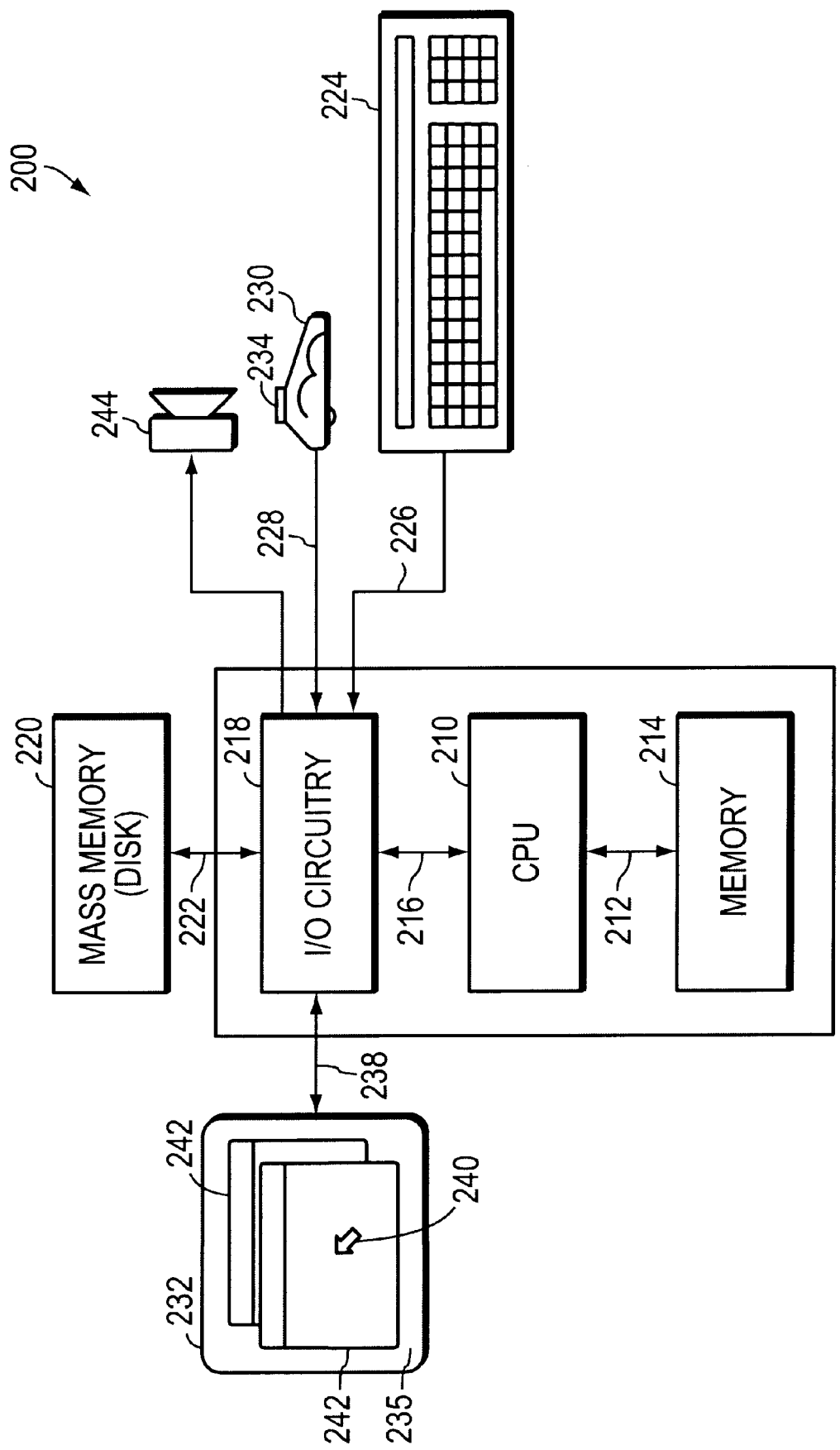
FIG. 2 is a computer system configured in accordance with the present invention.

FIG. 2 illustrates a computer system 200 comprising a central processing unit (CPU) 210 coupled between a memory 214 and input/output (I/O) circuitry 218 by bi-directional buses 212 and 216, respectively. The memory 214 typically comprises random access memory (RAM) for the volatile storage of information, including application programs and an operating system, and read only memory (ROM) for persistent storage of the computer's configuration and basic operating commands. As further described herein, the application programs and the operating system interact to control the operations of the CPU 210 and the computer system 200.

The I/O circuitry 218 may be connected to a mass memory storage unit 220, such as a disk drive, via bi-directional bus 222. In the typical system 200, the memory storage unit 220 contains instructions that can be read by the CPU 210 in order to configure system 200 to provide the program-development features of the present invention. Cursor/pointer control and input devices, such as a keyboard 224 and a mouse 230, connect to the I/O circuitry 218 via cables 226 and 228, respectively. The mouse 230 typically contains at least one button or switch 234 that may be operated by a user of the computer system 200. A monitor 232 having a display screen 235 is also connected to the I/O circuitry 218 via cable 238. A pointer or cursor 240 may be displayed on the screen 235 and its position can be controlled via the mouse 230 or the keyboard 224, as is well-known in the art. As described further herein, a window environment is displayed on the display screen 235 of the monitor 232. The window environment includes one or more windows 242. A speaker system 244 may also be connected to I/O circuitry 218.

In general, the I/O circuitry 218 receives information, such as control and data signals, from the mouse 230 and the keyboard 224, and provides that information to the CPU 210 for storage on the mass storage unit 220 or for display on the screen 235. The I/O circuitry 218 preferably contains the necessary hardware, e.g., buffers and adapters, needed to interface with the mouse 230, the keyboard 224 and the display monitor 232.

A suitable computer system 200 for use with the present invention includes a personal computer, such as those manufactured and sold by International Business Machines Corp. of Armonk, New York, Compaq Computer Corp. of Houston, Tex. or Apple Computer, Inc. of Cupertino, Calif. The present invention may also be practiced in the context of other types of computers, including Unix-type workstations from Sun Microsystems, Inc. or Hewlett Packard. All of these computers have resident thereon, and are controlled and coordinated by, operating system software, such as Microsoft Windows® 95, 98 or NT, MAC OS or UNIX.

Figure 3:
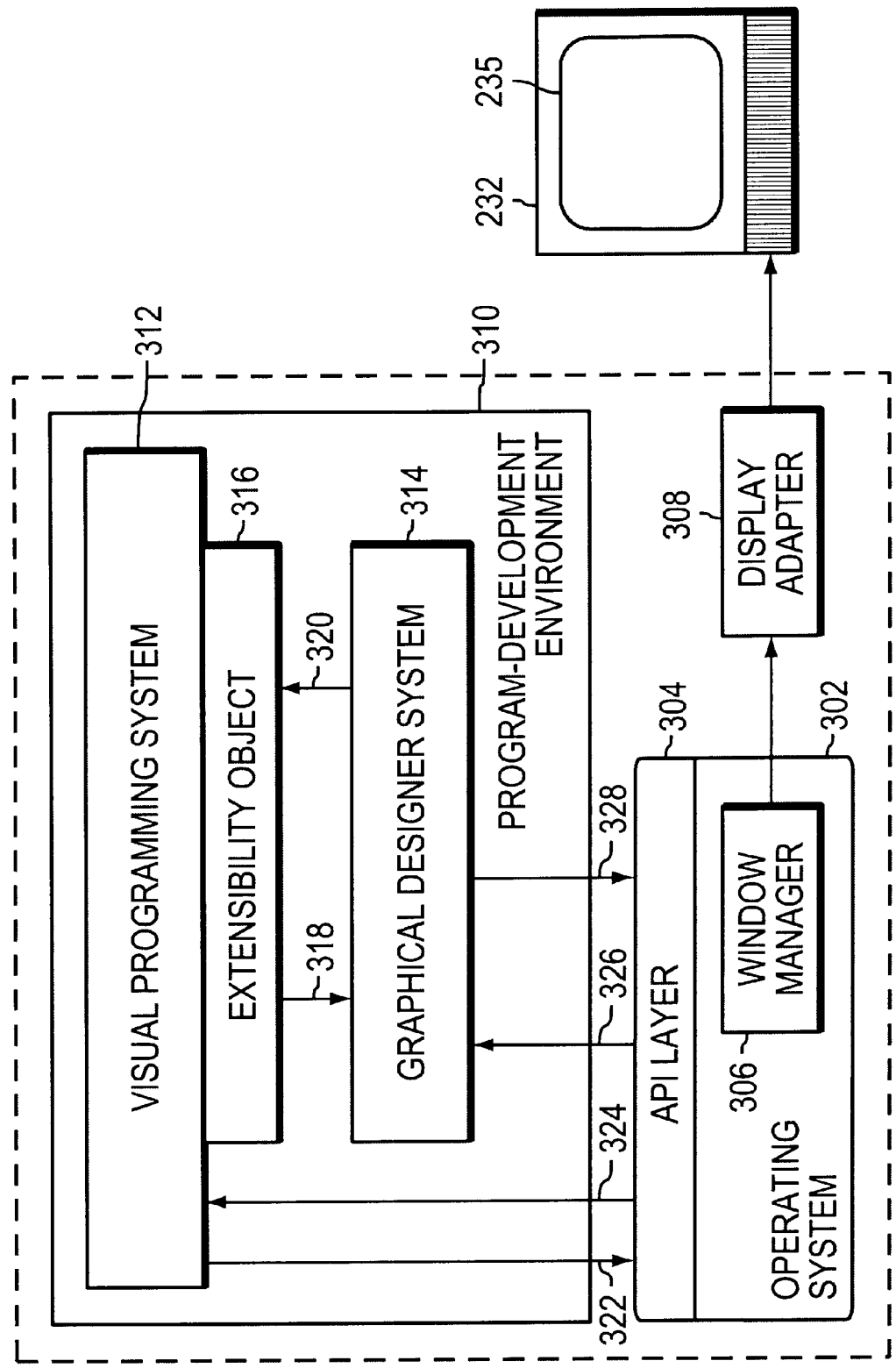
FIG. 3 is a highly schematic illustration of the software components of the computer system of FIG. 2.

FIG. 3 is a highly schematic illustration of the software components of the computer system 200 of FIG. 2. These components include an operating system 302 having an application programming interface (API) layer 304 through which other application programs executing on computer system 200 may interact with the operating system 302. In particular, operating system 302 exchanges task commands to control the operations of the computer system 200 as well as notifications regarding various activity (e.g., windows events) with these other applications. The operating system 302 further includes system facilities, such as a window manager 306 which, inter alia, can directly implements those task commands and windows events. These system facilities are basically software routines within the operating system 302 that interoperate with lower layers of the operating system 302 and are responsible for managing various services and functions. The window manager 306, for example, may use a graphics system and a screen buffer to draw and manipulate windows on the display screen 235 of monitor 232. Under the control of various hardware and software in the computer system 200, the contents of the screen buffer may be read out and provided to a display adapter 308. The display adapter 308 contains hardware and software (sometimes in the form of firmware) which converts the information from the screen buffer to a form which can be used to drive the display screen 235 of monitor 232.

The lower-layers of the operating system 302 also include device drivers for interfacing directly with the computer hardware. For each physical device, such as the mass storage unit 220 (FIG. 2), a device driver is provided to accept requests, to read or write data or to determine the status of the devices. Communication between the physical devices and CPU 210 (FIG. 2) may be effected either through polling of the device drivers or via interrupts.

In accordance with the present invention, a program-development environment 310 is also executing on the computer system 200. The program-development environment 310 includes an extensible visual programming system 312 and a graphical designer system 314. The visual programming system 312, in turn, may include an extensibility object 316, which provides an interface for communication between the programming system 312 and the graphical designer system 314 as indicated by arrows 318 and 320. Arrow 320 represents calls from the designer system 314 to the programming system 312, while arrow 318 represents calls from the programming system 312 to the designer system 314. Additionally, both the graphical designer system 314 and the visual programming system 312 may communicate directly with the operating system 302, e.g., exchange task commands and windows events, via API layer 304, as indicated by arrows 322–328.

In the illustrative embodiment, the extensible visual programming system 312 is Visual Basic 5.0 or higher (preferably 6.0) from Microsoft Corp., and the graphical designer system 314 is configured as a Visual Basic Add-In. Nonetheless, those skilled in the art will recognize that the present invention may also be advantageously used with other extensible visual programming systems, such as Visual C++, Visual J++, Visual Cafe, Visual InterDev, Delphi (for Pascal), etc. As described in more detail below, graphical designer system 314 allows the developer to switch the program-development environment 310 seamlessly between a graphical programming paradigm and a textual paradigm. The development environment 310 generates event handler procedures or program code for incorporation into the software program being developed, in response either to textual inputs or to graphical inputs from the developer.

To utilize the program-development environment 310, the developer first opens it in a conventional manner. For example, the development environment 310 may be represented by an icon on the user's desktop, which may be opened by "clicking" the icon using mouse button 234 (FIG. 2) in a conventional manner. Alternatively or in addition, the development environment 310 may be listed as one of the available programs within a Programs folder of a Start menu or by using a Run command. The development environment 310 may be configured, upon opening, to launch the corresponding visual programming system 312 and graphical designer system 314.

Figure 4A:
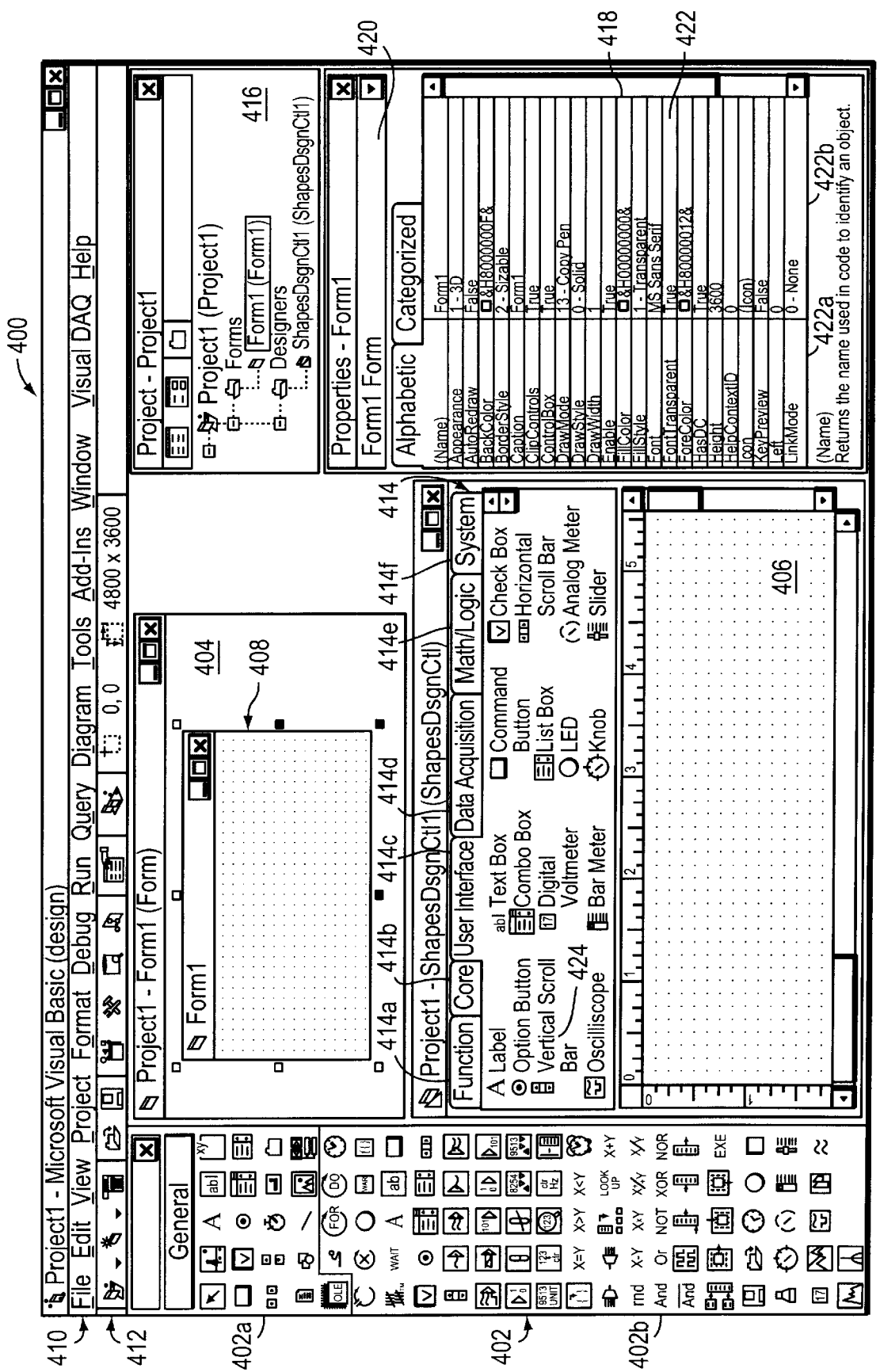
FIGS. 4A–4D are preferred illustrations of a graphical user interface in accordance with the present invention.

Upon opening, the graphical design system 314 cooperates with the visual programming system 312 to present a unified and coherent graphical user interface (GUI) to the developer on display screen 235 of monitor 232. FIG. 4A shows a preferred representation of this GUI 400. The GUI 400 has several elements, including at least one toolbox 402 that contains a plurality of icons. Each icon represents a corresponding component control or program object class that is available for use by the developer in creating application programs. The application programs that are ultimately created by the development environment 310 can be considered component-oriented, since they, among other things, call upon class factories that allocate memory for object members and ensure that the respective class methods have been loaded. The GUI 400 further includes one or more form windows 404 and a designer window 406. The form window 404 represents a container application that can "hold" instances of the control component or program object classes selected by the developer from the toolbox 402 for inclusion in the particular software program. By default, form window 404 includes a user form program object 408. The user form program object 408 basically provides an image of the user interface being developed for the application program. The GUI 400 may further include a menu bar 410 with a plurality of pull-down menu items and a toolbar 412 that contains a plurality of buttons providing short-cuts to commonly used tasks or functions.

As described below, the designer window 406 is configured to display a corresponding symbol for each program object added to the form window 404. These symbols, moreover, may be graphically linked together in order to create a data flow or block diagram that logically represents the flow of data and/or execution control of the application program that is being developed. The designer window 406 also includes its own toolbar 414, which may be divided into a plurality of sub-toolbars 414a–f, each having a corresponding tab that may be labeled (e.g., Function, Core, User Interface, Data Acquisition, Math/Logic and System). Disposed on each sub-toolbar 414a–f are one or more icons. Each icon represents a corresponding control component or program object class, the symbolic representation of which may be caused to appear in the designer window 406.

Each control component or program object instantiated from a corresponding class represented by an icon on toolbox 402 and/or toolbar 414 has pre-defined properties, methods and events. In addition, each program object typically performs some useful function, such as a Boolean operation (e.g., AND, OR, etc.), a mathematical operation, a data acquisition operation (typically from some transducer coupled to the I/O circuitry 218 of the computer 200), renders some comparison (e.g., less than, greater than, equal to, etc.), and so on. In the preferred embodiment, these control components or program objects are compatible with the ActiveX or Component Object Model (COM) technologies developed and made publicly available by Microsoft Corporation. The creation of ActiveX or COM objects is well-known to those skilled in the art and will not be described in detail here. For example, the creation of such objects is described in D. Appleman *Developing COM/ActiveX Components with Visual Basic 6* (1999). The program objects and their classes may be stored in one or more dynamic link libraries (DLLs) within the memory 214 of the computer 200. The graphical designer system 314 and/or the visual programming system 312 preferably includes a link (e.g., a pointer) to these DLLs so that the available program object classes may be displayed as icons on the toolbox 402 and on the designer toolbar 414.

The program objects intended for use with the program-development environment 310 of the present invention are preferably pre-configured to have certain novel properties, methods and events. These additional properties, methods and events include the following:

| PROGRAM OBJECT PROPERTIES | | |
|---|---|---|
| Name | Data Type | Description |
| CancelBlock | Boolean | If set, prevents program object from executing or from completing execution of its function. |

-continued

PROGRAM OBJECT PROPERTIES

| Name | Data Type | Description |
| --- | --- | --- |
| ControlIn | Boolean | When used, controls when program object begins execution of its function. |
| InvalidProperty | Integer | Invalidates an identified property of the program object in order to ensure orderly execution. |

PROGRAM OBJECT EVENTS

| Name | Description |
| --- | --- |
| RunBlock | Occurs when program object is about to commence executing its corresponding function. |
| InvalidateGroup | Occurs when program object is about to up-date one or more of its properties as a result of executing its corresponding function. |
| DataReady | Occurs after program object has up-dated one or more of its properties as a result of executing its corresponding function. |
| RateReady | Issued by program objects that perform scanning operations upon successful completion of a scan. |
| StatusReady | For program objects that operate in one or more modes or states, this event occurs repeatedly while the program object executes its corresponding function. |
| ControlOut | Occurs when program object has completed execution. |
| ErrorOut | Occurs if program object generated an error during execution and may contain an identification of the type of error that was generated. It may also occur to indicate that no error condition was generated during execution. | where Boolean means that the property may be set to True or False and Integer refers to any integer.

The GUI 400 may also include additional windows. For example, GUI 400 may include a project explorer window 416, which provides a hierarchical view of the current project. A project simply refers to the collection of files (e.g., form files, binary data files, class module files, etc.) and objects associated with the application program being developed. GUI 400 may also include a properties window 418 that displays the properties of a selected program object residing in the form window 404. The properties window 418 includes a pull-down object list 420, that contains a list of all of the program objects currently residing in the form window 404, and a property window 422, that is divided into two columns: a name column 422a and a current value column 422b. The name column 422a identifies all of the properties associated with the program object selected in the object list 420, while the current value column 422b shows the values that are currently associated with those properties.

To generate an application program, the developer selects one or more icons preferably from the designer toolbar 414 that perform requisite functionality for carrying out the tasks of the application program. In response, the program-development environment 310 places corresponding symbols in the designer window 406. The developer then graphically links these symbolic representations by drawing "wires" between them in order to create a data and/or execution control flow diagram. He or she will typically do this by using the mouse 230 (FIG. 2) or similar input device to cause the cursor 240 to move from one symbol to the next, although other graphical or even keyboard inputs may be used to perform the "graphical input". In response, the graphical designer system 314 of the program-development environment 310 generates an event handler procedure to be run as part of the application program being developed. In accordance with the invention, the development environment 310 also includes in the same resultant application program other event handlers, which the developer optionally specifies textually by entering commands and other information in a code window that the development environment 310 also provides on GUI 400. That is, the development environment 310 gives the developer the option of using textual inputs in order to specify event handlers that might otherwise be impossible or more difficult to represent graphically.

Suppose, for example, that the developer wishes to create a simple software program in which the position of a vertical scroll bar is displayed in a label. From the User Interface designer sub-toolbar 414c, the developer first selects the vertical scroll bar icon 424. To select icon 424, the developer uses the mouse 230 (FIG. 2) to position the pointer 240 over the vertical scroll bar icon 424 and activates (e.g., "clicks") the mouse button 234. This mouse click is a conventional windows event that is received by the operating system 302 (FIG. 3) in a conventional manner. Since the mouse click occurred over the designer window 406, operating system 302 passes this window event to the graphical designer system 314 of the program-development environment 310 by a communication mechanism represented by arrow 326, and the designer system 314 treats the windows event as a selection of the vertical scroll bar class by the developer.

Figure 4B:
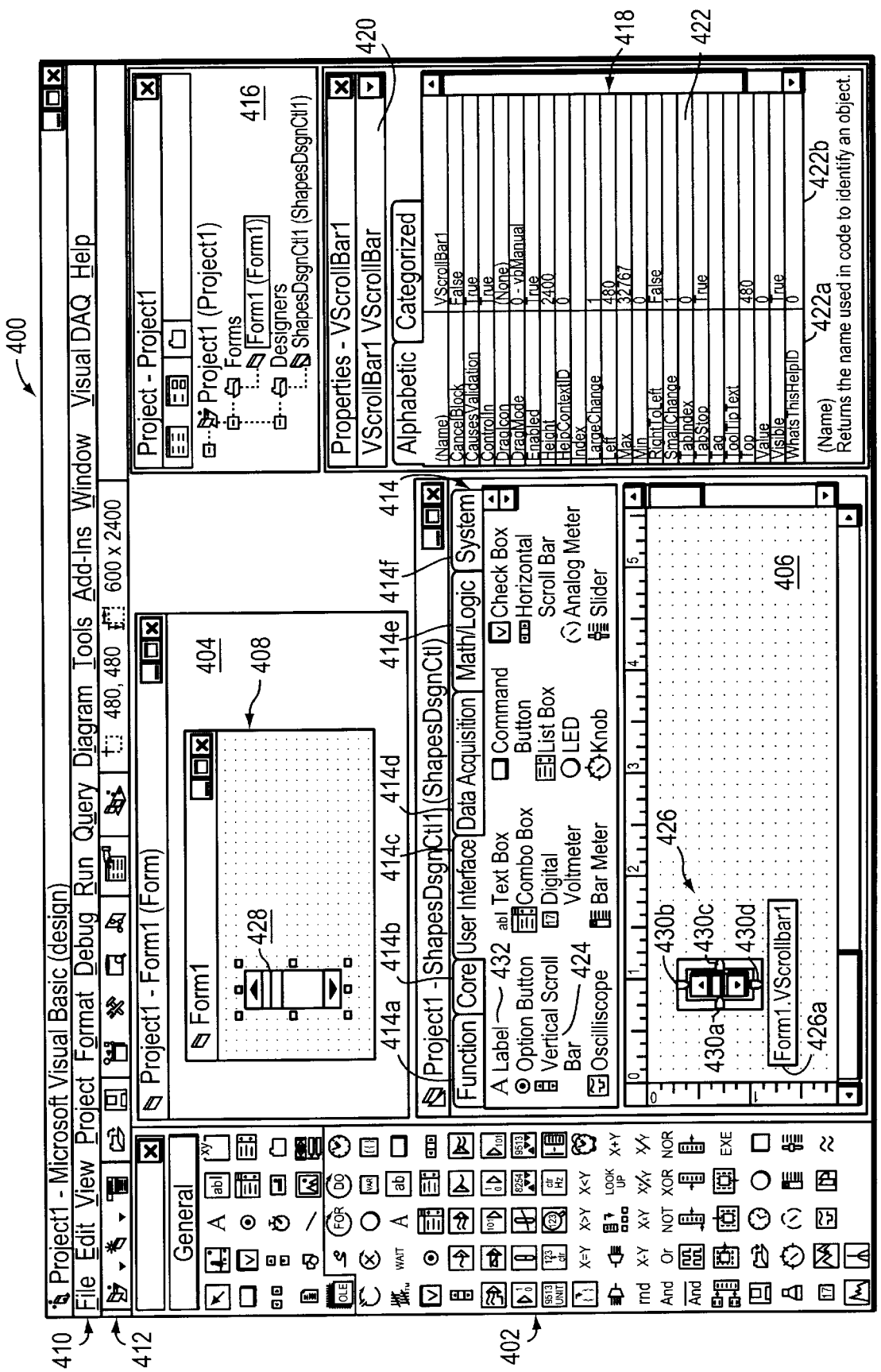

As shown in FIG. 4B, in response to the selection of icon 424 from the User Interface designer toolbar 414c, the graphical designer system 314 causes a symbolic representation 426 of the program object corresponding to the vertical scroll bar class to be displayed in the designer window 406. The designer system 314 also issues a call to the visual programming system 312 through its extensibility object 316 as represented by the communication mechanism of arrow 320. This call directs the visual programming system 312 to instantiate a program object from the vertical scroll bar class and add that program object to the container application represented by the form window 404. That is, form window 404 may maintain a linked list of pointers to program objects that are considered to "belong" to the form, and in this list is placed a pointer to the vertical scroll bar program object that was instantiated. Since the vertical scroll bar is a user interface element, the visual programming system 312 also causes a vertical scroll bar image 428 to appear in the user form object 408. Vertical scroll bar image 428 basically corresponds to the way in which the vertical scroll bar user element will appear in the respective user interface at run-time of the application program being created. Vertical scroll bar image 428 may be moved and/or re-sized by the developer in a conventional manner.

As part of the process of adding a program object to the form window 404, the visual programming system 312 also assigns a name to that program object. The name may consist of the object's class followed by an integer, e.g., VScrollBar1 for the first vertical scroll bar added to form window 404. The name uniquely identifies the program object within the form 408. Upon adding the program object to the form window 404, the visual programming system 312 preferably returns the assigned name to designer system 314 by a communication mechanism represented by arrow 318. The program-development environment 310 may then display a name 426a as part of the symbolic representation 426 of the object in the designer window 406. The name displayed in designer window 406, e.g., Form1. VScrollBar1, may be derived by concatenating the name of the program object, e.g., VScrollBar1, with the name of the form window in which it resides, e.g., Form1.

As indicated, the symbolic representations appearing in designer window 406 are used by the developer to create a data and/or execution control flow diagram that logically corresponds to the application program being developed. To facilitate the generation of such diagrams and the creation of corresponding event handlers by the program-development environment 310, each symbolic representation in designer window 406 preferably includes one or more terminals disposed about it. These terminals, moreover, are associated with some pre-defined combination of the properties, methods and/or events of the respective program object that is symbolically represented. Vertical scroll bar 426, for example, has four terminals 430a–d. In order to facilitate a generally left to right data flow direction and a top to bottom execution control flow direction, the terminals of all symbolic representations appearing within the designer window 406 preferably conform to the following general rules. Terminals on the left side of a given symbolic representation, such as terminal 430a of vertical scroll bar 426, preferably correspond to a property used as an input by the respective program object. Terminals on the right side of a symbolic representation, such as terminal 430c of vertical scroll bar 426, preferably correspond to (i) an optional property generated as an output and (ii) an event of the respective program object. Terminals on the top of a symbolic representation, such as terminal 430b preferably correspond to a property which, when changed to a new value, triggers execution of the respective program object, and terminals on the bottom of a symbol, such as terminal 430d of vertical scroll bar 426 preferably correspond to an event that occurs when the respective program object has completed execution of its respective function.

The vertical scroll bar program object, for example, has a plurality of pre-defined properties, methods and events. In particular, the properties of the vertical scroll bar program object include: Enabled, Height, Width, Minimum, Maximum, Value, etc. The methods associated with the vertical scroll bar program object include Move, Drag, Set-Focus, ShowHelp, Refresh, etc. The events associated with the vertical scroll bar program object include RunBlock, DataReady, ControlOut, etc.

Terminal 430a at symbol 426 is preferably associated with the vertical scroll bar's Value property. Terminal 430b is associated with the scroll bar's ControlIn property. Terminal 430c is associated with the vertical scroll's Value property and its DataReady event. Terminal 430d is associated with the object's ControlOut event.

Figure 5:
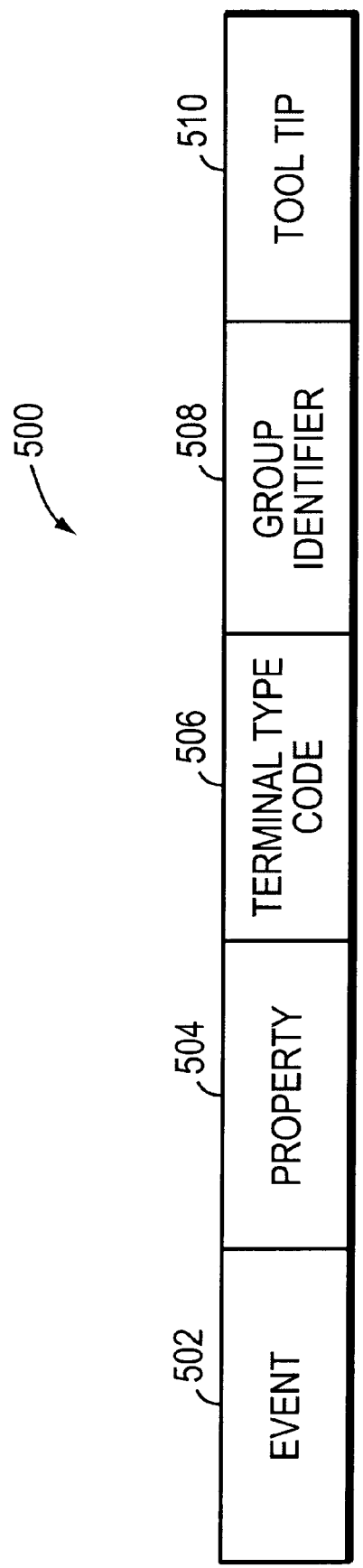
FIG. 5 is a highly schematic block diagram of a data structure for use with the present invention.

The association of properties and events to terminals is preferably maintained in a plurality of terminal data structures stored at memory 214 or 220. In particular, for each type or class of program object represented by an icon on the designer toolbar 414, there are one or more corresponding terminal data structures, depending on the number of terminals supported by the respective program object class. FIG. 5 is a highly schematic block diagram of a preferred terminal data structure 500. The terminal data structure 500 has at least four fields. A first field 502 preferably contains the name of the event, if any, that is associated with the particular terminal. A second field 504 preferably contains the name of the property, if any, that is associated with the particular terminal. If there is no event or property associated with the given terminal, then respective field 502 or 504 is set to null or de-asserted. A third field 506 preferably contains a code that identifies the particular type of terminal. In the illustrative embodiment, there are four types of terminals: data input, data output, control input and control output, and each type has a corresponding code. To the extent the data structure 500 corresponds to a data output type, a fourth field 508 is preferably used to store a group identifier. For a given type or program object class, the group identifier associates multiple data output type terminals whose corresponding properties are related to one another. For example, a joy stick object may have separate data output terminals for its "x" and "y" locations. Nevertheless, subsequent program objects should probably treat these two values as a single data point. Accordingly, the data output terminals associated with joy stick's "x" and "y" locations would preferably have the same group identifier. A fifth field 510 preferably contains a tool tip. A tool tip is a piece of descriptive text which is displayed to the developer when the cursor lingers over the respective terminal (e.g., "control input", "error output", and so on). The program-development environment 310 preferably maintains or otherwise has access to pointers to these various terminal data structures 500 within memory 214 (FIG. 2) (e.g., as a linked list). The pointers, moreover, may be mapped by the program-development environment to the names of the corresponding object classes so that, given the name of some object class, the program-development environment 310 can access the terminal data structures for each control or program object that has been instantiated from that class.

Symbolic representations appearing in the designer window 406, including the terminals, are preferably generated by the program-development environment 310 from respective bit maps stored in one or more image files within memory 214 (FIG. 2). The program-development environment 310 preferably maintains an association of bit maps to icons on the designer toolbar 414 so that when a developer selects a particular icon, the program-development environment 310 can direct the window manager 306 to draw the corresponding image from the appropriate bit map. Symbolic representations can also be moved about the designer window 406 by dragging them around with the mouse 230.

Figure 4C:
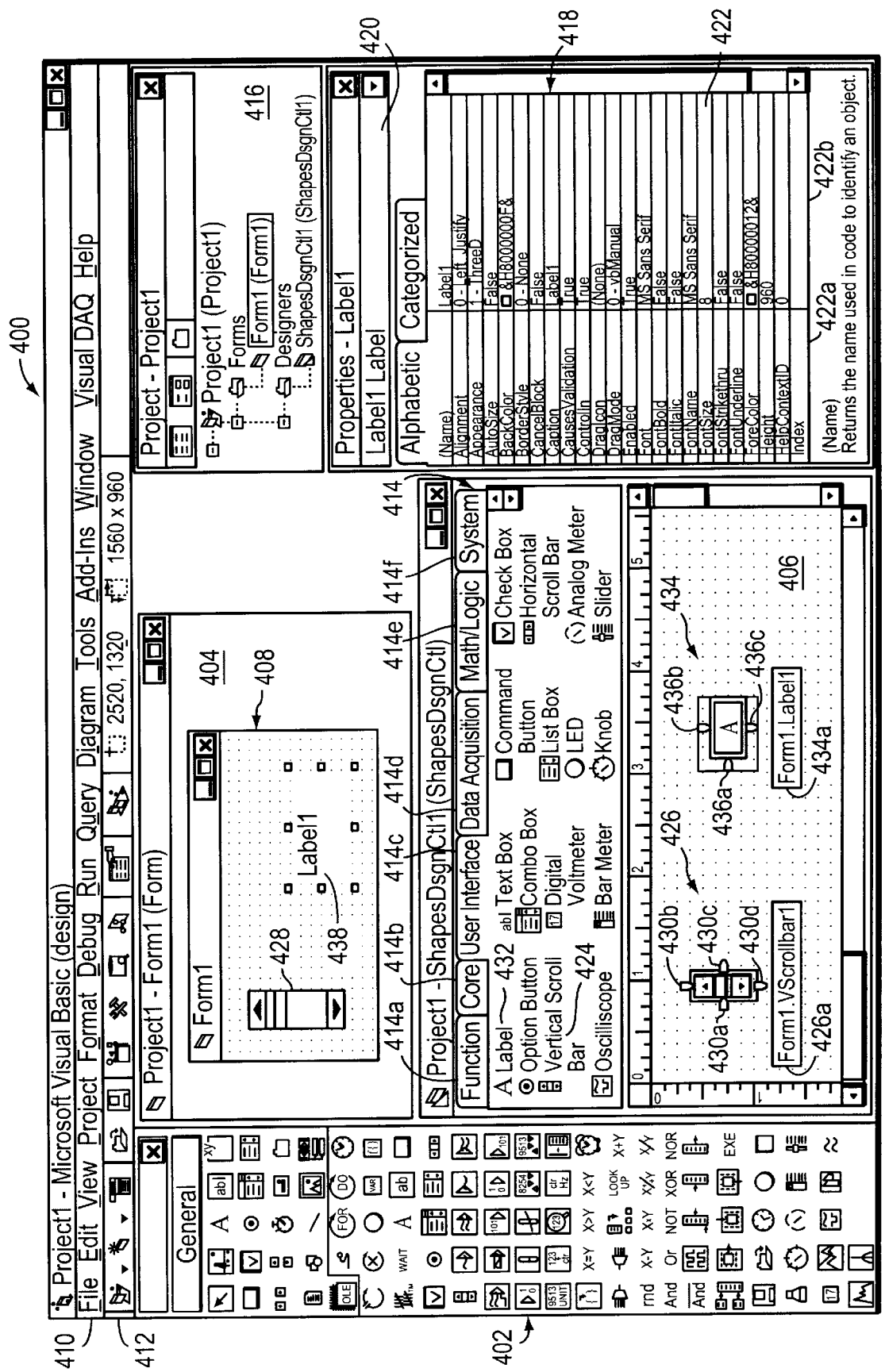

The developer then selects the next program object or control for use in the application program being created. Suppose that the developer selects the label icon 432 (FIG. 4B) from the User Interface sub-toolbar 414c. As shown in FIG. 4C, the program-development environment 310, in response, causes a symbolic representation 434 of a label program object to appear in designer window 406. Symbolic representation 434 also includes a plurality of terminals 436a–c and may further include a name 434a. The program-development environment 310 additionally directs the visual programming system 304 to add a label program object to form window 404. Since the label program object is also a user interface element, like the vertical scroll bar, the visual programming system 304 additionally causes a label image 438 to be drawn on the user form object 408.

The label program object has its own pre-defined properties, methods and events. For example, the properties of the label program object include Height, Visible, Font, BackColor, Caption, ControlIn, CancelBlock, etc. Its events include RunBlock, ControlOut, etc. Data input terminal 436a of symbol 434, moreover, is preferably associated with the label's Caption property. Terminal 436b is associated with the ControlIn property, and terminal 436c is associated with the ControlOut event. Note that symbol 434 does not have any data output terminals.

Generation of Event-Handler Code Through Graphical Inputs

At this point, the developer has two program objects residing in the form window 404. With the prior art systems, such as the. Visual Basic® programming system from Microsoft Corporation, the developer would now have to write one or more textual event handlers in order to have the position of the vertical scroll bar displayed in the label. As described above, the need to learn the keywords and syntax governing such textual event handlers has been a drawback to the use of Visual Basic by non-programmers, including scientists and engineers. With the program-development environment 310 of the present invention, the developer may cause the development environment 310 to generate corresponding handler procedure by simply graphically linking the symbolic representations of the program objects in the designer window 406 with one or more novel wire constructs. The developer need not generate any text-based code at all. Unlike the prior-art systems that only enable the user to graphically provide event handlers, though, the program-development environment 310 of the present invention also affords the developer the ability to provide or modify event handlers textually. It thereby frees the developer of the constraints and limitations imposed by such prior-art graphical programming tools.

To cause the position of the vertical scroll bar image 428 to be displayed in the label image 438 at application run-time, the developer graphically links the symbolic representation 426 of the vertical scroll bar program object to the symbolic representation 434 of the label program object using a wire construct, rather than writing a textual event handler. To connect symbols 426, 434 with a wire construct, the developer moves the cursor 240 (FIG. 2) to terminal 430c (FIG. 4C) at symbol 426 using the mouse 230. As described above, terminal 430c is associated with both the DataReady event and the Value property of the respective vertical scroll bar program object, i.e., VScrollBar1, which resides on the form window 404. With the cursor 240 over terminal 430c, the developer preferably executes a mouse click using mouse button 234. Since this mouse click occurred in the designer window 406, the operating system 302 (FIG. 3) passes the respective windows event to the designer system 314 by the communications mechanism represented by arrow 326. In response, the designer system 314 directs the operating system 302 to switch the mouse 230 from "cursor mode" to "line drawing mode" through a call via arrow 328. In particular, designer system 314 directs the operating system 302 to modify the appearance of the cursor 240 and to begin tracing subsequent mouse 230 movement with a line, whose first end is anchored to terminal 430c. Thus, as the developer drags the mouse 230 away from symbolic representation 426, a line emanates from terminal 430c following the movement of the mouse 230.

Figure 4D:
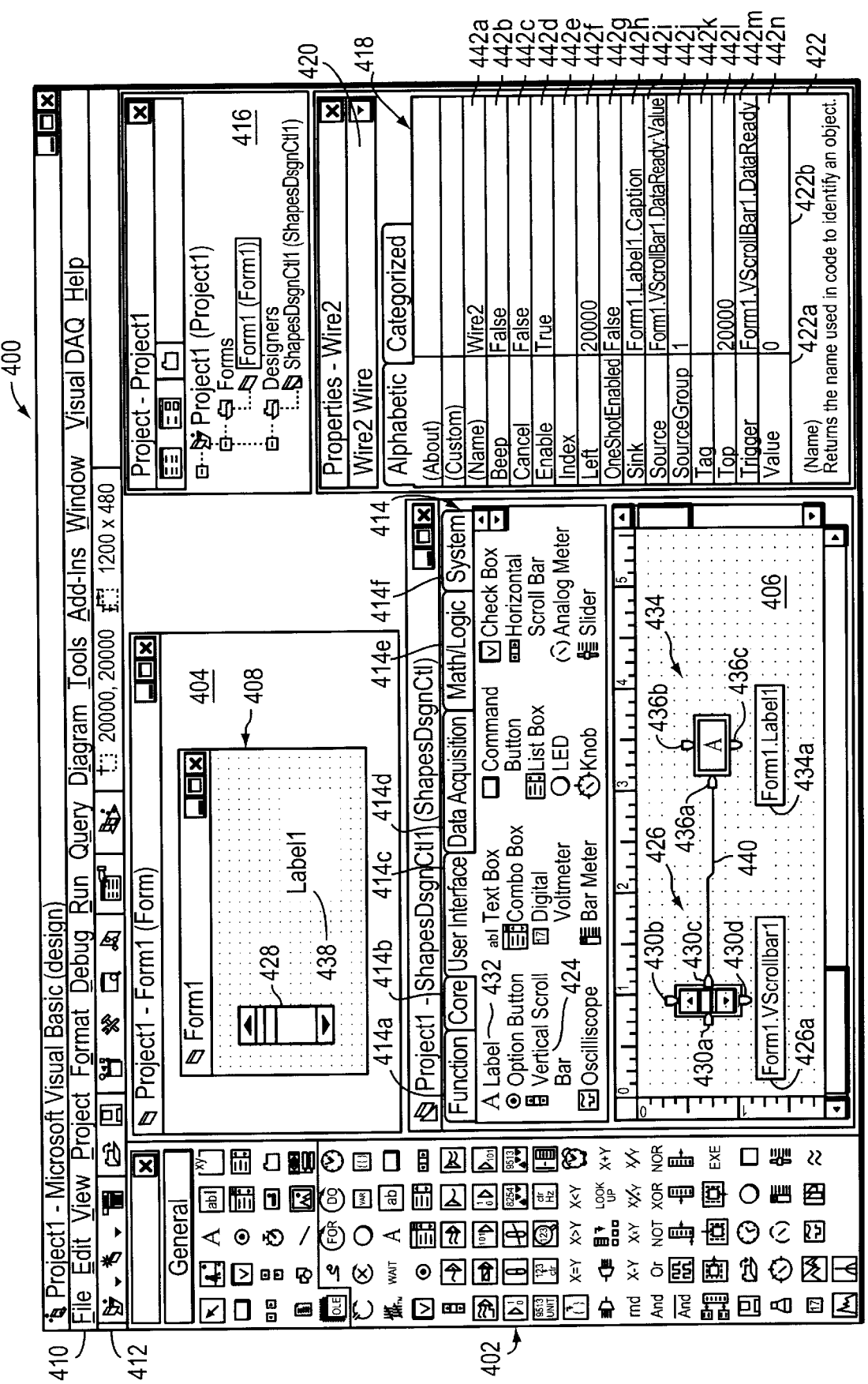

The developer preferably extends this line to terminal 436a of symbolic representation 434, which corresponds to label program object Label1 residing on form window 404. When the free end of this line reaches terminal 436a, the developer preferably executes a second mouse click. Again, the corresponding windows event is passed by the is operating system 302 to the designer system 314 and it, in response, causes the free end of the line to become attached to terminal 436a. Designer system 314 also directs the operating system to stop tracing mouse movement with a line and to return the cursor 240 to its original appearance. FIG. 4D is an illustration of the GUI 400 with a wire construct 440 extending between the two symbolic representations 426, 434.

In response to graphically connecting or linking two symbols in the designer window 406, the program-development environment 310 creates event handler program code that sets the label object's Caption property to the value of the vertical scroll bar object's Value property when the vertical scroll bar object's DataReady event occurs. Clearly, there are several ways in which this can be accomplished. For example, Visual Basic code for handling the indicated event (e.g., DataReady) and affecting the designated property (e.g., Caption) could be generated and added to the application program, and that event handler program code could then be compiled or interpreted in the normal manner at run-time. Preferably, though, the program-development environment 310 instantiates a new control or program object, a wire program object, adds this new object to the form window 404 and sets its properties in a predetermined manner. The basic function of the wire program object is to retrieve the Value property from the vertical scroll bar object in response to the DataReady event and to set the Caption property of the label program object to that Value. That is, this new object basically provides event handler functionality for other program objects residing in the form window 404.

Specifically, the graphical designer system 314 directs the visual programming system 312 through calls to its extensibility object 316, as arrow 320 indicates, to instantiate a wire component control or program object from the wire object class and to add this object to the form window 404. That is, form window 404 adds a pointer to the wire program object to its linked list of controls. It should be understood that the wire construct 440 appearing in the designer window 406 is preferably just a symbolic representation of the wire program object added to the form window 404. The visual programming system 312 also assigns a name to this program object, e.g., Wire2, which it returns to the designer system 314. As described below, as part of its initialization procedure, designer system 314 preferably directs the visual programming system 312 to instantiate and add a wire program object, which may be named Wire1, to the form window 404. Thus, the "first" wire that is drawn on the designer window 406 by the developer actually corresponds to the second wire program object to be instantiated and added to the form window 404. Therefore, this wire program object is typically assigned the name Wire2.

The wire control or program object is itself a program module having its own predefined properties, methods and events. In the illustrative embodiment, each wire control or program object has the following properties, methods and events:

WIRE CONTROL PROPERTIES

| Name | Data Type | Description |
| --- | --- | --- |
| Name | Text | Specifies the name of the wire program object. |
| Beep | Boolean | Determines whether the wire program object emits a "click" sound whenever it is triggered. |
| Cancel | Boolean | Determines whether the wire program object executes upon being triggered or invoked. |
| Enabled | Boolean | Determines whether the wire program object executes in response to its triggering event. |
| Index | Text | Distinguishes between two or more wire program objects having the same name. |
| Left | Integer | Specifies the x-coordinate position of an image of the wire program object appearing on the user form object. |
| OneShot-Enabled | Boolean | If Enabled property is False, determines whether the wire program object should nonetheless execute one time. |

-continued

WIRE CONTROL PROPERTIES

| Name | Data Type | Description |
|---|---|---|
| Sink | Text | The name of the sink program object and its respective property to which the wire program object is graphically connected. |
| Source | Text | The name of the source program object and its respective property to which the wire program object is graphically connected |
| Source-Group | Integer | Used to organize related properties of the source program object. |
| Tag | Text | Assigns an additional identifier to the wire program object, typically for use by the application program. |
| Top | Integer | Specifies the y-coordinate position of an image of the wire program object appearing on the user form object. |
| Trigger | Text | The name of the program object and its respective event, the occurrence of which causes the wire program object to execute. |
| Value | Variant | A data store, the contents of which can be copied from the source, modified, if desired, and passed to the sink by the wire program object. |

WIRE CONTROL METHODS

| Name | Description |
|---|---|
| Run | Causes the wire program object to execute. |

WIRE CONTROL EVENTS

| Name | Description |
|---|---|
| Action-(Value) | Occurs in response to the wire program being triggered or run. The argument corresponds to the current value of the wire's Value property prior to any event handling routines. |
| Done | Occurs once the wire program object has finished propagating its Action event and setting the specified sink property, provided that the Cancel property is still false. | where Boolean means that the property may be set to True or False, Text means that the property is an alpha-numeric string, Integer means that the property is an integer, and Variant means that the property can take any of the data formats specified by the corresponding variant structure definition.

After the visual programming system 312 has added the wire program object to the form window 404 and returned its name, the designer system 314 next sets the various properties of this wire program object. The wire's properties, moreover, may be displayed in the property window 422 (FIG. 4D) of property window 418, as indicated by rows 442a–n, by selecting the wire program object, e.g., Wire2, from pull-down object list 420. The particular values to which the wire's properties are initially set depends on the particular program objects that have been logically connected by the wire construct 440 within designer window 406. For each wire control or program object, the designer system 314 identifies three corresponding program objects: a "source" program object, a "sink" program object and a "trigger" program object. Designer system 314 also examines the terminal data structures 500 that are associated with the graphically linked terminals 430c and 436a. Designer system 314 then uses this information to set the properties of the respective wire program object, i.e., Wire2.

It should be understood that attempts by the developer to wire a first input terminal to a second input terminal or a first output terminal to a second output terminal are rejected by the program-development system 310.

To identify the source, sink and trigger program objects, designer system 314 determines the names of the program objects that have been linked by the subject wire construct 440, the form window(s) on which those program objects reside, and the particular types of terminals that have been graphically linked by wire construct 440. As indicated above, information regarding the names of the graphically linked program objects and the form window(s) on which they reside is returned to the designer system 314 by the visual programming system 312 when system 304 adds those program objects to the form window 404. Thus, designer system 314 already has this information in its allocated portion of memory 214. Information regarding the types of terminals that have been linked is derived by the designer system 314 from the terminal type code fields 506 for the terminal type data structures 500 associated with the respective terminals, i.e., terminals 430c and 436a. The designer system 314 uses this terminal type information to determine which of the linked program objects should be considered the source object, which program object should be considered the sink object, and which program object should be considered the trigger object. In the preferred embodiment, the program object whose linked terminal is either a data output or control output type is treated as the source object, while the program object whose linked terminal is a data input or control input type is treated as the sink object. Here, linked terminal 430c at symbolic representation 426 is a data output terminal, while terminal 436a at symbolic representation 434 is a data input terminal. Thus, the designer system 314 considers the VScrollBar1 program object to be the source object and the Label1 program object to be the sink object for respective wire object, i.e., Wire2.

After identifying the source and sink control objects, the designer system 314 is ready to set the Sink, Source and Trigger properties 442h, 442i and 442m of Wire2. The wire program object's Source property is preferably a concatenation of the following information: the name of the form window 404 on which the source program object resides, e.g., Form1, the name of the source program object, e.g., VScrollBar1, and the property associated with the linked terminal at the source program object, e.g., Value. The Source property may further be concatenated with the event associated with the linked terminal at the source program object, e.g., DataReady. The designer system 314 preferably obtains the source event and property parameters for use in setting the wire's Source property from the event field 502 and property field 504 from the terminal data structure 500 associated with linked terminal at the source program object, i.e., terminal 430c. For data output type terminals, such as terminal 430c, system 314 similarly obtains the Source-Group property parameter 442j from the group identifier field 805 from the corresponding terminal data structure 500.

The wire program object's Sink property 442h is preferably a concatenation of the following information: the name of the form window 404 on which the sink program object resides, e.g., Form1, the name of the sink program object, e.g., Label1, and the property associated with the linked terminal at the sink program object, e.g., Caption. Again, the designer system 314 preferably obtains the sink property parameter from the property field 504 of the terminal data structure 500 associated with linked terminal at the sink program object, i.e., terminal 436a. The wire program object's Trigger property 442m is preferably a concatenation of the following information: the name of the form window 404 on which the source program object resides, e.g., Form1, the name of the source program object, e.g., VScrollBar1, and the event associated with the linked terminal at the source program object, e.g., DataReady. As described above in connection with setting the Source property, this information may be derived from the name of the source program object and also from the contents of the event field 502 of the terminal data structure 500 associated with linked terminal at the source program object, i.e., terminal 430c. It should be understood that the designer system 314 may derive and set the Source property 442i first and then strip off the specified property of the source (e.g., Value), which was obtained from field 504 of the corresponding terminal data structure 500, to set the Trigger property 442m.

The wire program object preferably includes built-in functionality that automatically sets its Beep, Cancel and OneShotEnabled properties 442b, 442c and 442g to FALSE, and its Enabled property 442d to TRUE. The Value property 442n is preferably set, at least initially, to null or is otherwise de-asserted.

In the preferred embodiment, wire program objects are not intended to appear in any of the user interfaces that may be generated at run-time of the application program being developed. Accordingly, the Left and Top properties 442f, 442l of all wire program objects, which specify where on the user form object 408 an image of the object should appear (and, hence, where on the run-time user interface those images should appear), are set to default values (e.g., "20000") that are sufficiently high so as to "place" the image of the wire program objects off of the user form object 408. Thus, at run-time, no image appears on the user interface corresponding to any wire program object that may nonetheless reside on the corresponding form window. Additionally, or alternatively, the wire object's Visible property may be set to FALSE.

Each wire program object instantiated and added to the form window 404 in response to graphical inputs of the developer includes at least some program code that may be called upon to execute when the respective application program is run. This program code, which is generated solely in response to the developer having graphically linked the symbolic representations of two program objects, basically causes the sink program object, e.g., Label1, to execute or otherwise take some action in response to an event generated by a trigger program object, e.g., VScrollBar1, and using some property of the source control object. That is, the wire object represents event handler procedures or code incorporated within the application program.

Figure 6A:
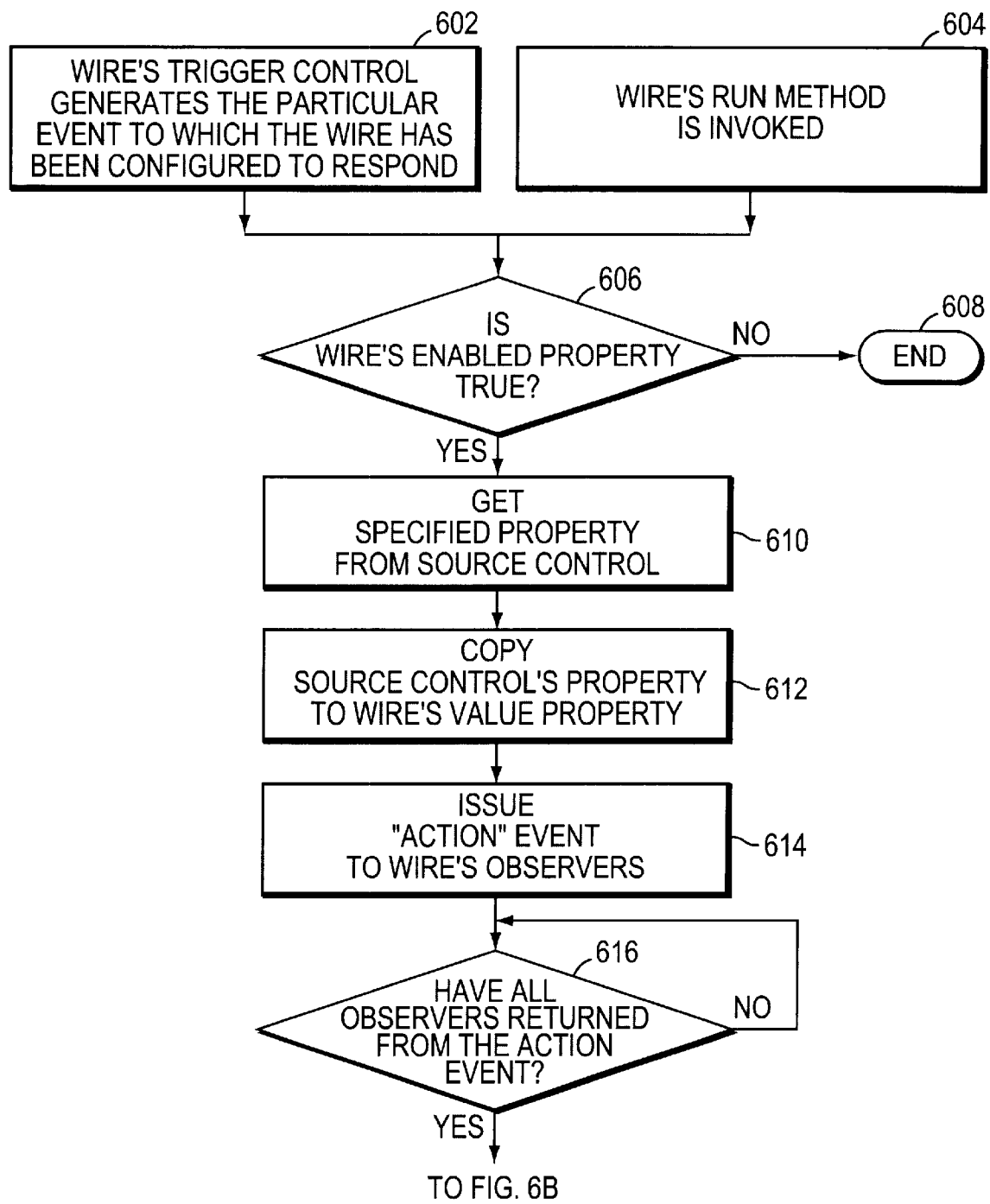
FIGS. 6A–6B, 7, 10A–10B and 12 are flow diagrams of preferred methods of the present invention.
Figure 6B:
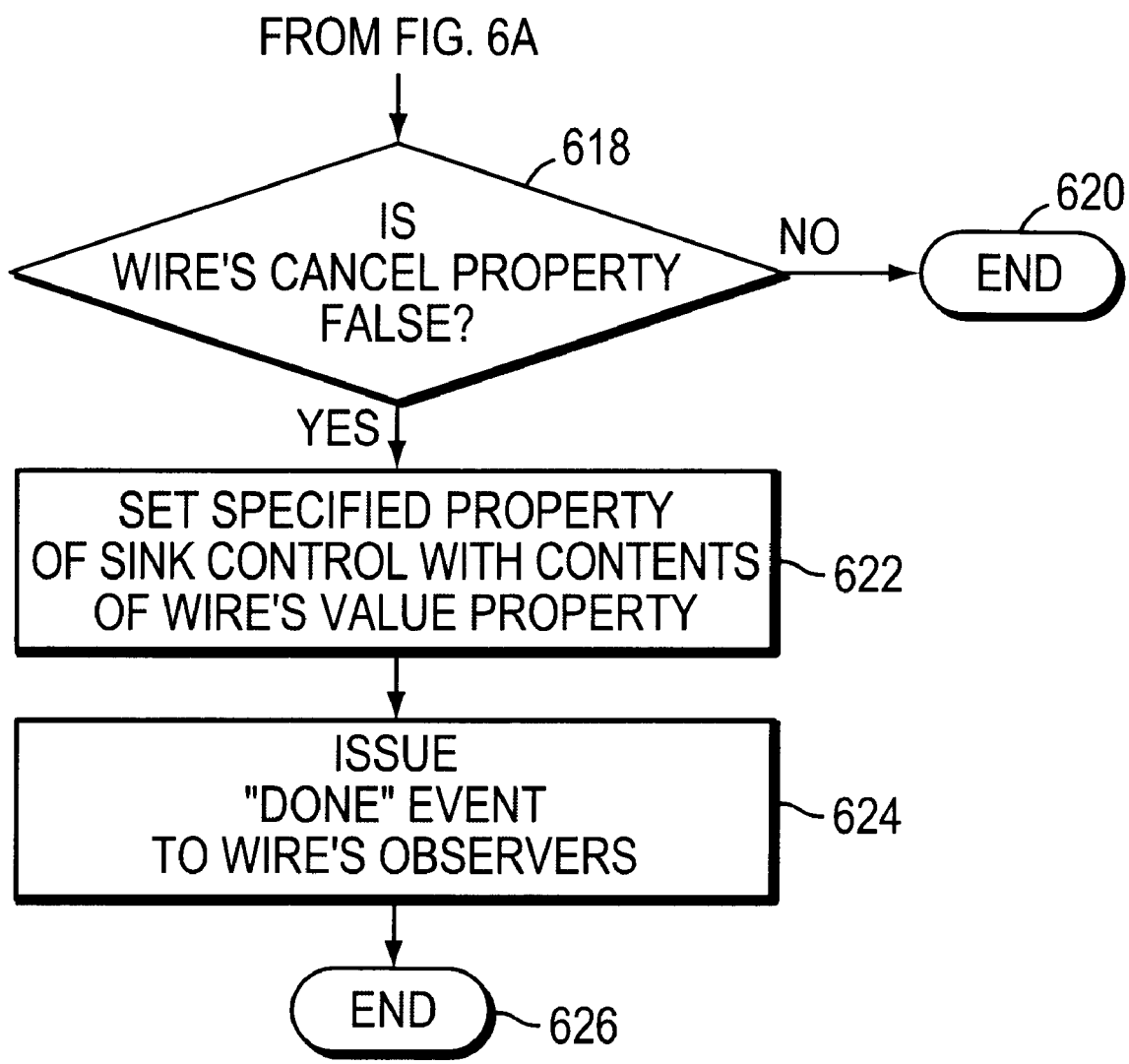

FIGS. 6A and 6B are a flow diagram of the steps corresponding to the preferred event handler procedure or code generated by the program-development environment 310 in response to such graphical inputs from the developer. This procedure may be called upon to execute during run-time of the application program. Running of the graphically generated event handler procedure may be initiated in one of two ways. First, it is initiated when the trigger control component, as identified in the wire's Trigger property 442m, e.g., VScrollBar1, issues the particular event also identified in the wire's Trigger property 442m, e.g., DataReady, as indicated by block 602. In order to learn of the occurrence of this event (e.g., DataReady), the wire program object preferably registers with the trigger program object using an Event_Advise_Notification( ) method having the desired event as an argument. In response, the VScrollBar1 object notifies Wire2 whenever its DataReady event occurs. Alternatively, the event handler procedure may be initiated by invoking the wire's Run method, as indicated by block 604. Following initialization, the next step is to determine whether the wire program object's Enabled property 442d is TRUE, as indicated at block 606. If the wire's Enabled property 442d is FALSE, the code preferably ends, as indicated by first end block 608. As explained above, when the wire program object is first instantiated, it sets its Enabled property 442d to TRUE. Thus, unless the Enabled property 442d was subsequently set to FALSE at some point during run-time, as explained below, or was re-set by the developer, the response to decision block 606 is typically yes.

As indicated at block 610, the event handler procedure next retrieves the value of the property specified in the wire's Source property 442i, e.g., Value, from the source object, e.g., VscrollBar1, also identified in the wire's Source property 442i. To do this, a Get( ) method may be invoked on the source program object. A separate Get( ) method may be invoked for each readable property. The Get( ) method is a conventional method that is preferably supported by all of the component controls or program objects utilized by the program-development environment 310 of the present invention. As an argument to the Get( ) method, the code inserts the name of the property, e.g., Value, the value or setting of which is to be returned. Suppose the current setting of the VScrollBar1's Value property is "15". Then, in response to the Get( ) method, the VScrollBar1 returns "15" to the wire program object. This value may be returned to the wire program object through either a Pass_By_Value or Pass_By_Reference communication method, both of which are well-known to those skilled in the art. The wire program object next copies this value, i.e., "15" to its own Value property 422n, as indicated at block 612. Upon copying the value into its Value property, the wire program object preferably issues its Action event, as indicated at block 614. Other elements or processes of the application program, including other component controls or program objects, may register as "observers" with the wire program object using the Event_Advise_Notification method described above so as to be notified of the wire's Action event. These observers may respond to the wire's Action event in any number of ways. At decision block 616, the wire program object waits until all of these "observers" have indicated that they have finished processing the wire's Action event.

Next, the wire program object queries whether its Cancel property 442c (FIG. 4D) is FALSE, as indicated at block 618. As explained above, when the designer system 314 first sets the properties of a wire program object, it sets the Cancel property 442c to FALSE. In response to the wire's Action event (or some other event), however, another process, control component or program object may change the wire's Cancel property 442c from FALSE to TRUE. If the wire's Cancel property 442c is TRUE, then execution stops as indicated by second end block 620. Assuming the wire's Cancel property 442c is still FALSE, then the wire next up-dates the Sink property 442h, i.e., Caption, with the current value of its own Value property 442n, as indicated at block 622. This may be accomplished by invoking a Set( ) method on the sink control identified by the wire's Sink property 442h, i.e., Label1. A separate Set( ) method may also be invoked for each settable property. The Set( ) method is another conventional method supported by all of the component controls or program objects utilized in the program-development environment 310 of the present invention.

After setting the sink's property, the code corresponding to the wire program object issues a Done event, as indicated at block 624. Observers may similarly register with the wire program object, again using the above-described Event_Advise_Notification method, so as to be notified of its Done event. These observers may be configured to take any number of different actions in response to the wire's Done event. At this point, the wire program object has finished executing as indicated by third end block 626.

Figure 7:
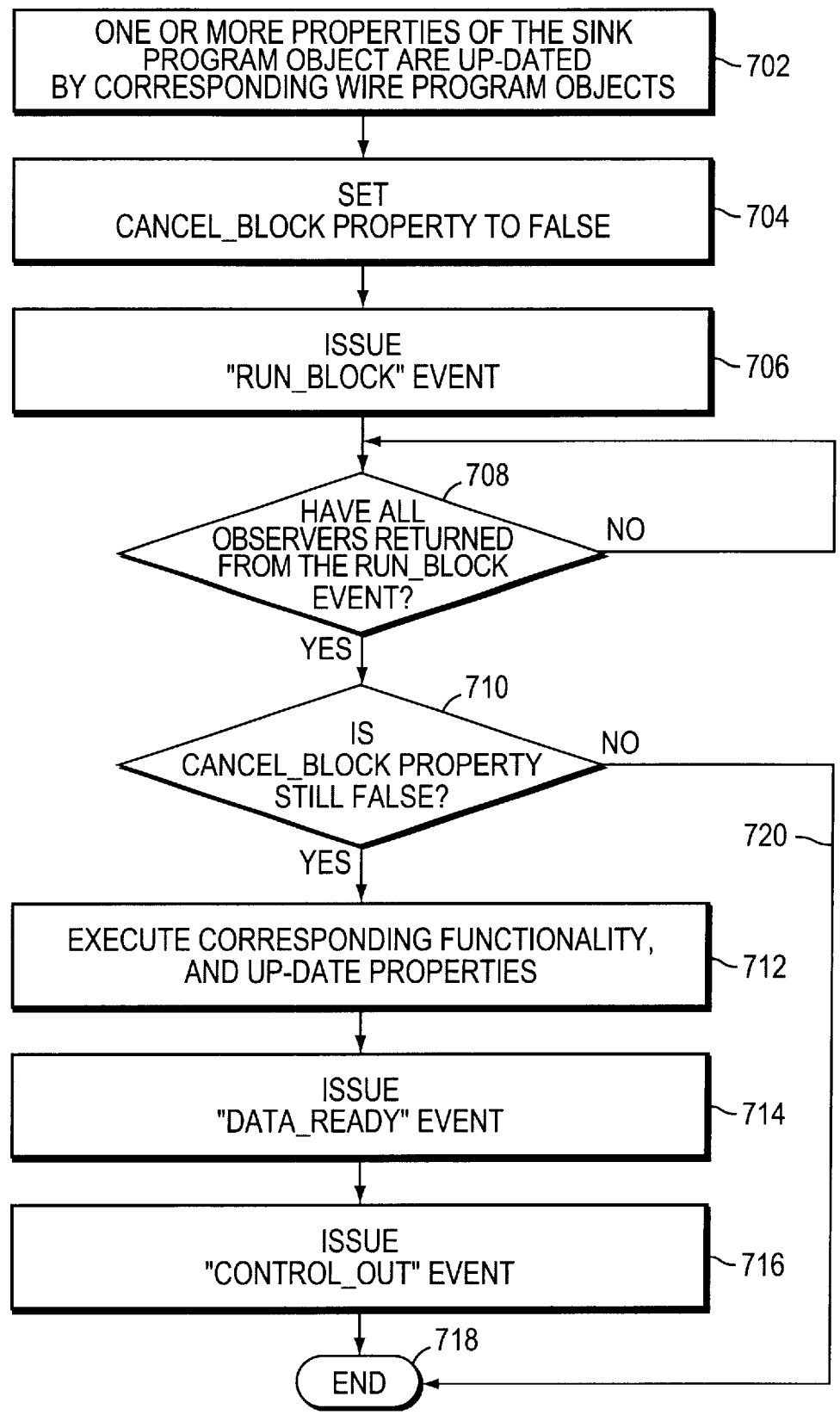

FIG. 7 is a flow diagram of steps preferably executed by a typical program object, such as the Label1 program object, incorporated in the application program being developed during application run-time. The program object begins execution in response to one or more of its properties being up-dated by a corresponding wire object as indicated at block 702, such as when the Wire2 object up-dates the Caption property of Label1. Next, the program object sets its CancelBlock property to FALSE as indicated at block 704. The program object then issues its RunBlock event as reflected at block 706. As with the Action and Done events issued by the wire program objects, observers (including wire program objects) may register with the program object using the Event_Advise_Notification mechanism so as to be notified of its RunBlock event. These observers may interact with the program object by, for example, changing its properties etc. As indicated by decision block 708, the program object waits until all such observers have returned from its RunBlock event.

Next, the program object determines whether its CancelBlock property is still FALSE as indicated at decision block 710. One or more of the observers could have set the program object's CancelBlock property to TRUE in response to processing the Run-Block event. If its CancelBlock property is still FALSE, the program object executes its corresponding functionality and up-dates its own corresponding properties as warranted as indicated by block 712. Upon up-dating its properties, the program object issues its DataReady event as indicated by block 714. To the extent a wire program object is connected to one of this program object's data output terminals, the issuance or occurrence of the DataReady event may trigger that wire program object to begin operation. After is issuing its DataReady event, the program object next issues its ControlOut event as indicated by block 716. To the extent the program object's control output terminal is connected to a wire construct, the corresponding wire may begin operation. Execution of the program object is now complete as reflected by End block 718. If, in response to decision block 710, the program object's CancelBlock property is TRUE, then processing stops at that point as indicated by No arrow 720 leading from decision block 710 to End block 718.

It should be understood that a given program object may execute its corresponding functionality, as described at step 712, and then issue a RunBlock event, as described at step 706. This may be implemented by objects that perform mathematical operations, for example, and are thus less likely to cause erroneous data propagation problems in the corresponding application program. It should be further understood that, depending on the type of program object, other events besides DataReady may be issued. For example, program objects that operate in discrete or determinative modes or states, such as the For Loop, Do Loop and Wait objects, described below, or an Analog In Scan object, may issue one or more StatusReady events in place of the DataReady event. Program objects that perform scanning functions, such as Analog In Scan or Analog Out Scan, may issue a RateReady event in place of the DataReady event. Those skilled in the art, moreover, will recognize that other such events may be defined and implemented by the program objects utilized with the program-development environment 310.

Generation of Event-Handler Code Through Textual Inputs

A significant advantage of the present invention is its ability also to generate event handler procedures or code in response to textual inputs by the developer. In some circumstances, for example, it may be more efficient to specify an event handler textually rather than graphically. In particular, following the example of FIGS. 4A–D, suppose the developer wishes to have the background color of the label image 438 turn red during run-time whenever the value to be displayed exceeds 15000. Although the label object has a BackColor property, in the absence of a specific terminal on the corresponding symbolic representation 434 for the Label1 program object that is associated with this property, it would be difficult to specify this functionality graphically. Indeed, with the prior art graphical program languages, such as HP VEE and LabVIEW, it would be extremely difficult, if not impossible, to provide this functionality, because the graphical images for the label program object provided by these prior art systems do not have a terminal or pin for setting the object's background color in response to the value of its Caption property.

With the present invention, the program-development environment 310 allows the developer to switch to a textual programming paradigm in order to specify an event procedure or other functionality that is more easily described textually as opposed to graphically. To specify an event handler textually, the developer directs the program-development environment 310 to call-up and display a code window in which textual inputs may be entered by the developer. More specifically, the developer, using mouse 230, moves the cursor 240 (FIG. 2) over the symbol of interest, e.g., Label symbol 438 (FIG. 4D), as displayed in the designer window 406 and executes a double mouse click. Since the cursor 240 is over the designer window at the time of the mouse click, the operating system 302 (FIG. 3) preferably passes the respective windows event to the graphical designer system 314. In response, the designer system 314 issues a call to the visual programming system 312, via arrow 320, causing it to display a code window on GUI 400 (FIG. 4D).

Figure 8A:
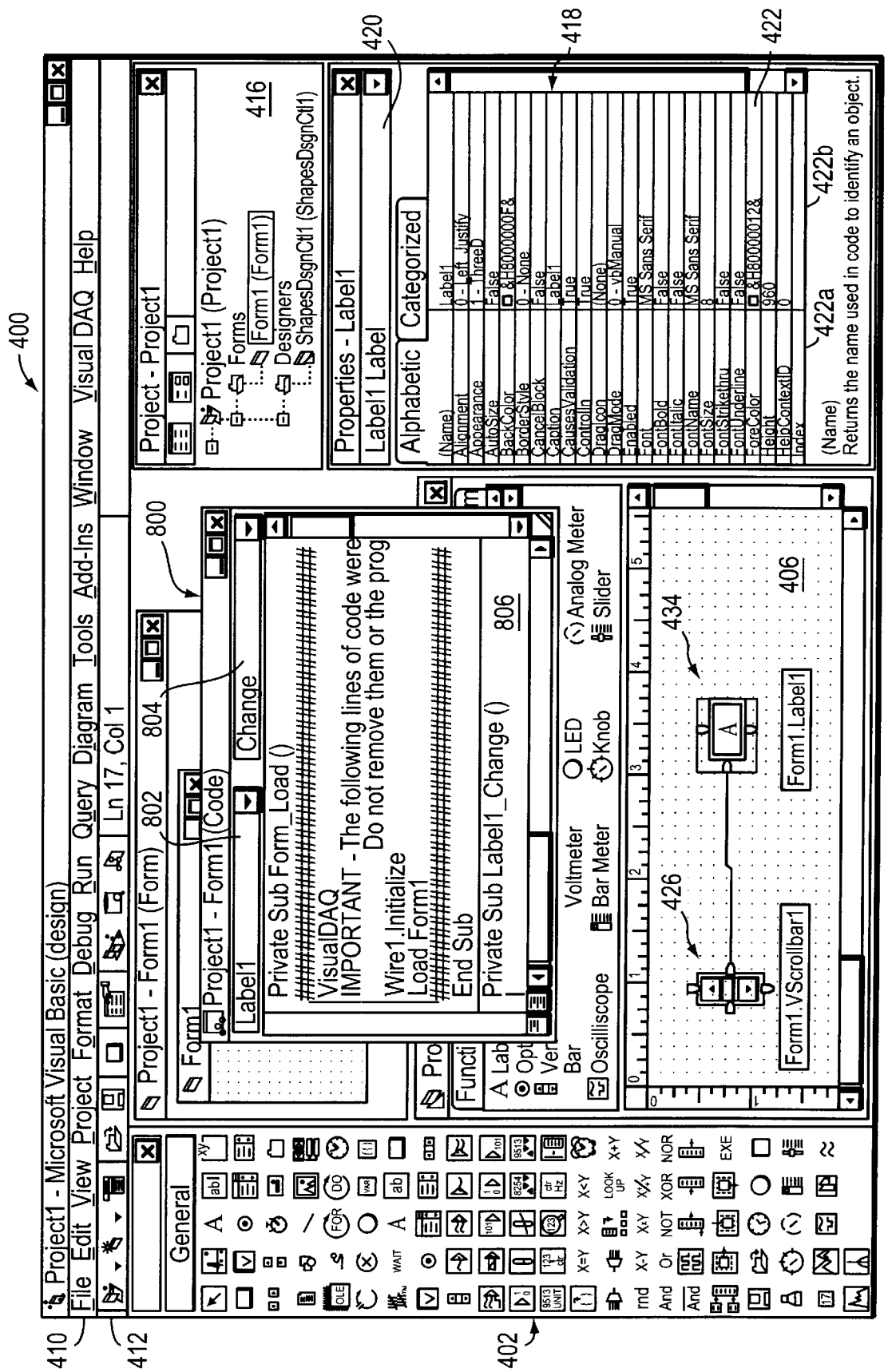
FIGS. 8A and 8B are preferred illustrations of the graphical user interface including a window for receiving textual inputs.

FIG. 8A is a preferred illustration of the GUI 400 of FIG. 4D further including a code window 800. Code window 800 includes a pull-down object box 802, which contains a list of all of the program objects currently residing in the form window 404. By default, the object box 802 initially displays the program object selected by the developer, e.g., Label1. Code window 800 further includes a pull-down procedures/events box 804, which contains a list of all of the procedures and events supported by the selected program object of object box 802. Selecting a particular procedure or event from box 804 positions the entry point for subsequent textual inputs at the first line of the respective procedure or event. The procedures/events box 804 may initially display the first event supported by the corresponding object, e.g., the Change event, which is issued when an object's Value property changes. Code window 800 further includes an input area 806. Within the input area 806, the developer can write, review and edit program code for the respective application program using the keyboard 224 to generate textual inputs. In the preferred embodiment, the developer enters one or more statements within input area 806. A statement is basically a syntactically complete unit that expresses some action, declaration or definition. A statement generally occupies a single line, although a first designated symbol, e.g., the colon (":"), may be used to include more than one statement on a line, and a second designated symbol, e.g., the line-continuation character ("_"), may be used to continue a single logical line onto a second physical line.

Figure 8B:
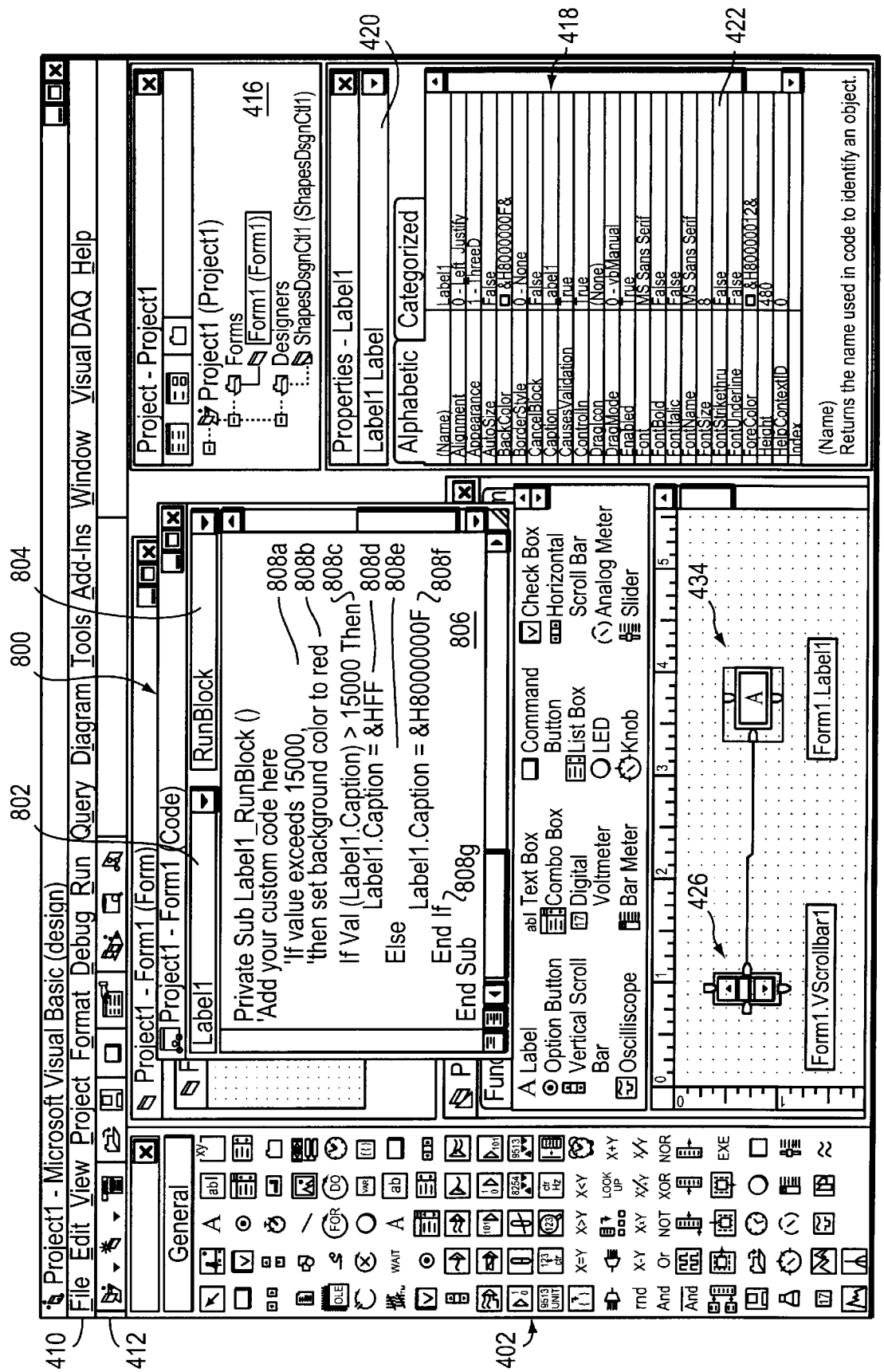

FIG. 8B is a preferred representation of the GUI 400 after the developer has written a series of statements 808a–g into the input area 806 of the code window 800 following the selection of the RunBlock event from the procedures/events box 804. As indicated above, statements 808a–g comply with the keywords and syntax defined by the programming language supported by the visual programming system 312 of the program-development environment. In the illustrative embodiment, this programming language is Microsoft's Visual Basic. Statements 808c–g specify the functionality for turning the background color of the label image 438 red if its Caption property (which is set to the Value property of VScrollBar1) exceeds 15000. Statements 808a–b are simply comment statements that describe the functionality to be carried out by the subsequent statements.

In response to entering one or more statements in the input area 806 of code window 800, the program-development environment 310 generates constituent program code for insertion in the corresponding application program. That is, at run-time, the statements 808a–g are compiled or interpreted and executed as required, thereby implementing the functionality of the corresponding statements.

Those skilled in the art will understand that the code window 800 may be called-up in other ways. For example, the developer may choose the "Code" option (not shown) from the View command of menu bar 410.

It should be understood that a developer may also display and edit the properties of a wire program object, thereby causing the program-development environment 310 to modify the corresponding event handler procedure. As described above, the developer may cause the properties of a wire object, e.g., Wire2, to be displayed in the properties window 418 of GUI 400. By selecting one of the properties listed in the property window 422 of window 418, typically through a mouse click, the developer can edit the selected property. For example, although the wire program object preferably sets its Beep property 442b to FALSE upon instantiation, the developer may re-set this property to TRUE through textual inputs entered in the property window 418. In response, the event-handler procedure generated by the program-development environment 310 causes the computer system 200 to sound a tone each time the wire program object executes.

The developer may also change a given wire object's trigger property 442m to a different event and/or a different program object. More specifically, as described above, the program-development environment 310 sets the trigger property 442m of a wire program object based on the particular source terminal, e.g., terminal 430c, to which the wire construct 440 of the corresponding wire program object, e.g., Wire2, is connected. The wire program object, moreover, executes in response to the occurrence of the event specified in its trigger property 442m. By editing the trigger property 442m, a developer may cause the program-development environment 310 to modify the corresponding event handler procedure such that the wire program object now executes in response to some newly identified event and/or program object (e.g., an object other than the wire's source object). To prevent developer-induced errors, the program-development environment 310 may be configured to block the display (and thus the editing) of wire program object properties through property window 418.

Although the program development environment 310 of the present invention involves graphical event handler code generation, some implementations may not provide that capability for all available control components or program objects that may be incorporated into a given application program. Or, they may provide different toolbox icons or elements for the same control components, some of which enable the developer to program the control's event handlers graphically and others that do not. In such implementations, the toolbox 402 (FIG. 4A) may be divided into two areas. A first area 402a contains a plurality of icons corresponding to program object classes that can only be used in the form window 404. The program objects corresponding to these icons do not have a corresponding symbolic representation for use in the designer window 406. A second area 402b contains a plurality of icons that can be used in both the form window 404 and the designer window 406. That is, the program objects corresponding to these icons include symbolic representations capable of display in the designer window 406.

Detecting the Presence of Branches in the Data/Control Flow Diagram and Ensuring Synchronous Execution of Program Objects at Run-Time In creating the data/control flow diagram within designer window 406 (FIG. 4D), a developer may connect more than one wire construct to the same terminal of a given program object so that the same data or information may be provided to two different program objects in response to the same event. Similarly, the developer may connect two wire constructs to two separate but related or complementary output terminals of the same program object. The resulting data/control flow diagram thus has a fork defining two or more "branches" or "streams". If these two streams subsequently converge at some point downstream, e.g., some other program object, problems may arise if this downstream program object reacts (e.g., executes its associated function) in response to new data or information on only one stream.

More specifically, since many computer systems only include a single processor, the program steps corresponding to the branches must be executed in some order. That is, the steps of one branch are typically executed before the steps of another. Such serial execution can cause problems if a downstream object executes in response to new data or information from only one stream. That is, by executing when only part of its input data or properties have been up-dated, the program object and thus the application program in which it is incorporated may produce un-intended results. To avoid such problems, the program-development environment 310 of the present invention preferably includes a mechanism that causes such program objects to wait until the data or information from both streams has been up-dated before acting (e.g., executing its associated function).

In the illustrative embodiment, the wire program objects incorporated into an application program are further configured to detect the presence of such forks in the respective data/control flow diagram, and to ensure that "stale" data or information is invalidated by the appropriate program objects. In general, an initialization process is run before run-time of the application. The initialization process determines which wire program objects are connected to the same output terminals of the same program objects and, therefore, exist at a fork in the data/control flow diagram. The initialization process also identifies and informs those program objects that will be receiving control input information during run-time (i.e., those objects whose ControlIn properties may be changed).

At run-time, the wire program objects execute a branch-detection and data/control flow coordination process. More specifically, when a wire program object is about to set the associated property of its corresponding sink program object, the wire first determines whether it exists at a fork of the data/control flow diagram. If so, the wire program object causes its sink program object to first invalidate the current property that is about to be up-dated and directs all other wire program objects also located at the fork to do the same, and the sink objects cause the wire objects connected to their output terminals to invalidate their own sink objects and so on until the end of the flow diagram is reached. As a result, all of the program objects located downstream of the fork, invalidate the "stale" data currently associated with their data input terminals. After the downstream program objects have invalidated their input values, the wire program object then sets the sink property, thereby validating the sink property. Only when all of the data input terminals of the downstream program objects are validated do the program objects execute their associated functionality and up-date their output properties, thereby ensuring proper coordination.

Figure 9:
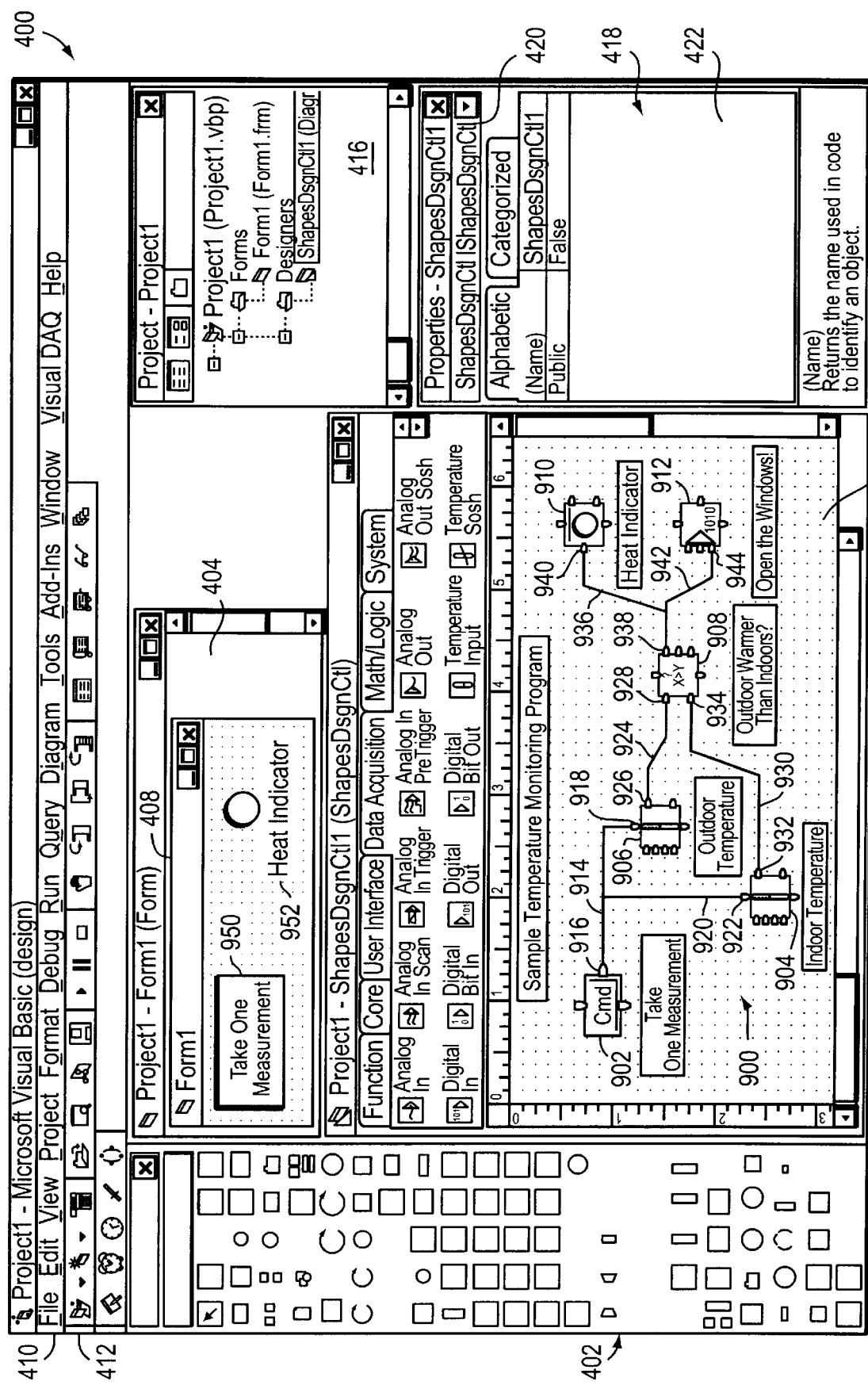
FIG. 9 is a preferred illustration of a graphical user interface having a branching flow diagram.

FIG. 9. is an exemplary illustration of the GUI 400 generated by the program-development environment 310 (FIG. 3) having a branched data/control flow diagram 900 graphically represented within the designer window 406. In particular, diagram 900 includes a command button symbolic representation 902, two analog input symbolic representations 904, 906, a comparator symbolic representation 908, an LED symbolic representation 910 and a digital output symbolic representation 912. The analog input symbols 904, 906 correspond to program objects that can obtain indoor and outdoor temperature measurements, respectively. Symbolic representations 902–912 are inter-connected by a plurality of wire constructs, each of which corresponds to a respective wire program object that resides in the form window 404 and is thus incorporated into the application program. Specifically, a first wire construct 914 connects a data output terminal 916 of button symbol 902 to a control input terminal 918 of outdoor temperature symbol 906. A second wire construct 920 connects the data output terminal 916 of button 902 to a control input terminal 922 of indoor temperature symbol 904.

A third wire construct 924 connects a data output terminal 926 of the outdoor temperature symbol 906 to an "x" data input terminal 928 of the comparator symbol 908. A fourth wire construct 930 connects a data output terminal 932 of indoor temperature symbol 904 to a "y" data input terminal 934 of the comparator symbol 908. A fifth wire construct 936 connects a data output terminal 938 of comparator symbol 908 to a data input terminal 940 of the LED symbol 910. A sixth wire construct 942 also connects data output terminal 938 of comparator symbol 908 to a data input terminal 944 of the digital output symbol 912. Each wire construct 914, 920, 924, 930, 936 and 942, moreover, corresponds to a wire program object residing on form window 404.

As shown, the data/control flow diagram 900 includes several forks. In particular, a first fork exists at data output terminal 916 of button symbol 902 since both wire construct 914 and 920 are connected to this terminal. A second fork exists at data output terminal 938 of comparator symbol 908 since both wire construct 936 and 942 emanate from this terminal.

Furthermore, appearing within the user form program object 408 of GUI 400 are a button image 950, that has been labeled "Take One Measurement", and an LED image 952 that has been labeled "Heat Indicator".

In response to the developer having "drawn" the wire constructs 914, 920, 924, 930, 936 and 942, on the designer window 406, the program-development environment 310 generates corresponding event handler procedures or code in a manner as described above. The event handler procedures for wire constructs 914 and 920, for example, cause the indoor and outdoor temperature program objects of symbols 904, 906 to acquire a temperature measurement in response to user selection of the button image 950, which measurements are then provided to the comparator program object of symbol 908. Preferably, however, the comparator program object of symbol 908 only executes when new temperature data has been received at both terminal 928 and terminal 934. If the comparator program object were to react when just one of its data input terminal 928 or 934 is up-dated (thus rendering the information associated with other data input terminal stale), it may be making an un-intended comparison. Since the program-development environment 310 (FIG. 3) of the present invention may be running on a single processor computer system, such as computer 200 (FIG. 2), true parallel operation is not possible and thus only one of the data input terminals 928 or 934 will be up-dated at a time. To prevent such un-intended operating characteristics, the program-development environment 310 employs a novel synchronization process.

In particular, the program-development environment 310 preferably incorporates program instructions or code corresponding to one or more initialization processes into each application program that is developed. These initialization processes, which are executed at application run-time, first identify all wire program objects whose corresponding constructs reside at a fork of the corresponding data/control flow diagram, e.g., diagram 900. To do this, the wire objects compare their respective source and Source-Group properties 442*i*, 442*j* (FIG. 4D). If two or more wire objects have the same Source and Source-Group, then they are either connected to the same data output terminal and thus exist at a fork, or they are connected to different, but nonetheless related or complementary, output terminals of the same source object, and thus should be treated as if they exist at a fork.

Next, each wire program object invalidates its sink property to prevent unintended or spurious execution of the program objects of the application program. More specifically, each wire program object sets the InvalidProperty property of its sink program object, as identified in its respective sink property 442*h*, to the particular identifier that is associated with the sink property. That is, each property of a program object, in addition to having a name and a value, also has an identifier, which may be a numeric or alphanumeric string. Other program objects, including the wire program objects, can obtain these identifiers by querying the object (e.g., with a standard COM mechanism). In response to having its InvalidProperty set to the particular identifier for one of its properties, the corresponding sink program object sets a flag associated with the identified property to indicate that the value of this property is now invalid, and thus should not be used by the sink program object. In this way, program objects learn whether their control input terminals are connected to any wire constructs within the flow diagram, e.g., diagram 900 (FIG. 9). In other words, wire objects connected to control input terminals set the InvalidProperty of their sink objects to the identifier for the sink's ControlIn property. Thus, if a program object's InvalidProperty is set to the identifier for its ControlIn property, then the object "knows" that its control input terminal is connected to a wire construct, and that information may thus be received from this wire construct. At this point, the initialization process is preferably complete and the application program may be run.

It should be understood that the initialization process may also identify all root blocks within the data/control flow diagram. A root block is any program object whose symbolic representation does not have a wire construct connected to either its data input or control input terminals. In addition, all variable program objects, which are described in detail below, are treated as root blocks even if one or more of their data or control input terminals are connected to corresponding wire constructs. In flow diagram 900 of FIG. 9, the object corresponding to command button symbol 902 is a root block. During run-time of the application program, data and/or control flow typically begins at one or more of the root blocks of the corresponding flow diagram, and proceeds to flow down-stream of the root(s) (e.g., from source objects to sink objects). To identify the root block(s) of a flow diagram, the source and sink properties of each wire object may be examined. If a particular program object only appears as a source for one or more wire objects, and not as a sink for any wire object, then that program object is considered a root block.

Figure 10A:
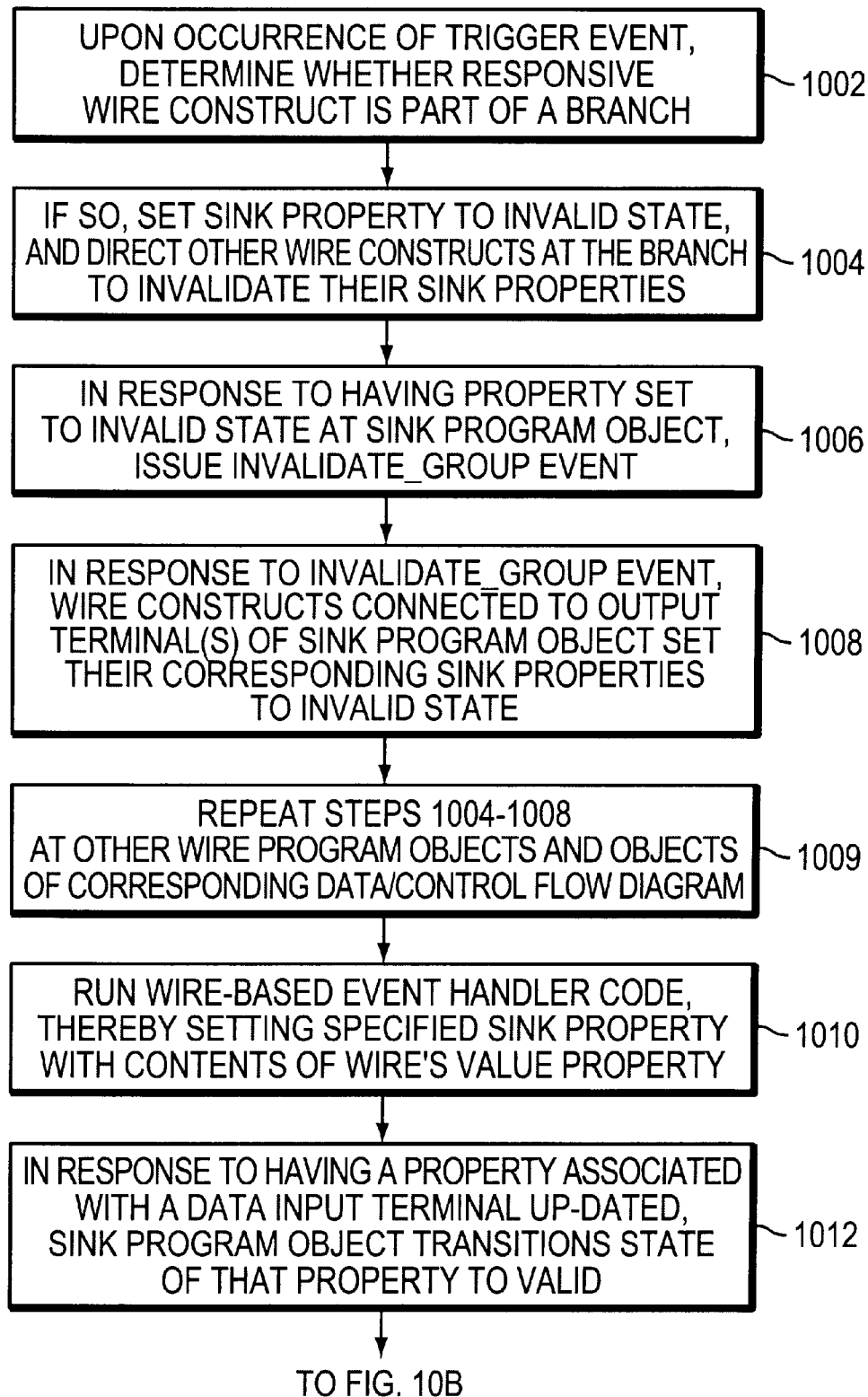
Figure 10B:
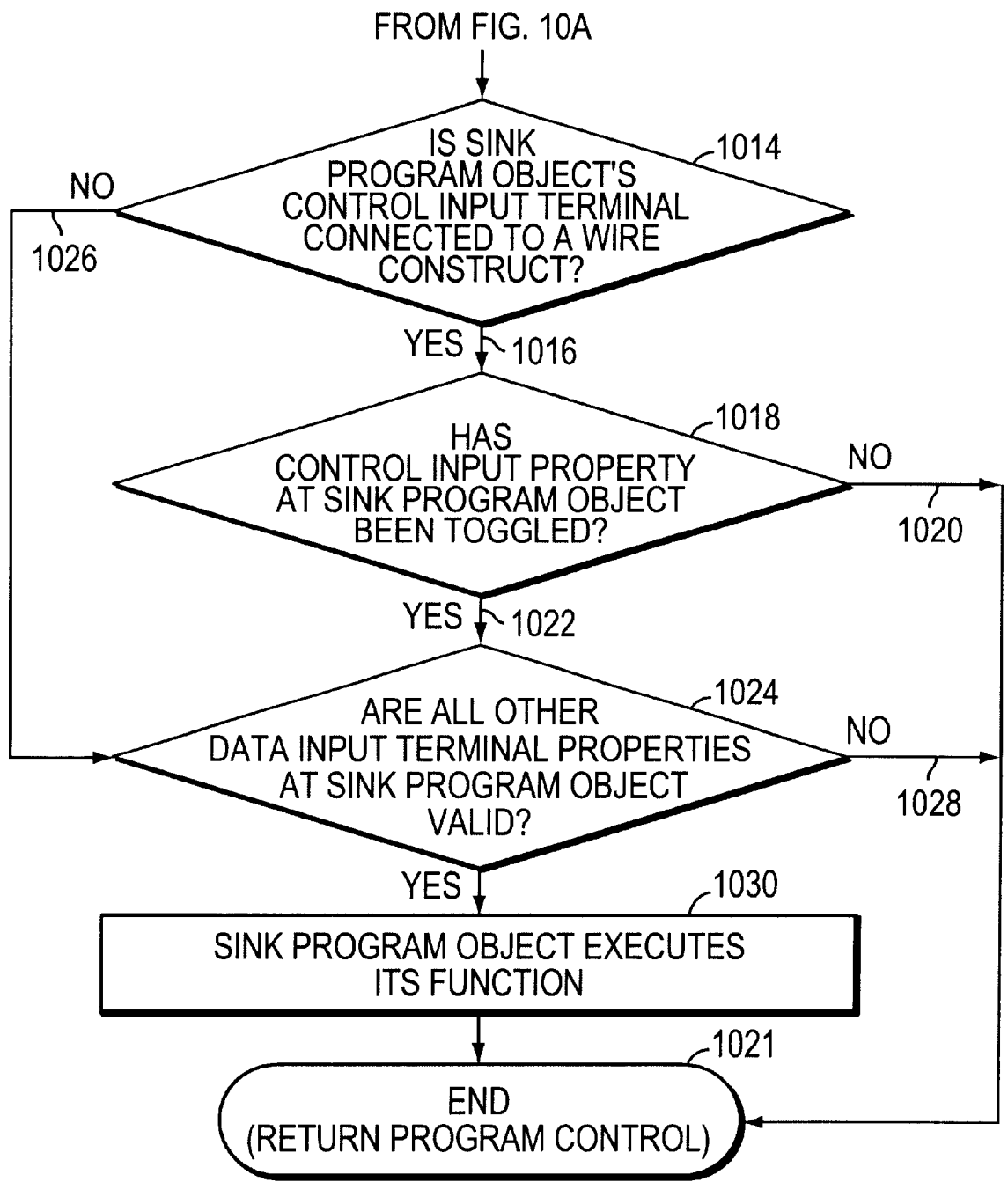

FIGS. 10A–10B illustrate a flow chart of the steps corresponding to the running of an application program whose flow diagram includes one or more forks, such as diagram 900 (FIG. 9). In response to the occurrence of its corresponding triggering event, a wire object that is part of any flow diagram, first determines whether it is at a fork as indicated at step 1002. As described above, by virtue of the initialization process, all wire objects know whether or not they are at a fork of the flow diagram. If it is at a fork, the triggered wire object invalidates its sink property and directs the other wire objects at the fork to invalidate their sink properties as indicated at block 1004. In response to having a control or data input property invalidated, a program object preferably issues an InvalidateGroup event as indicated at block 1006. Those wire objects connected to the data output or control output terminals of such a program object are configured to respond to the issuance of the InvalidateGroup event. In other words, these wire objects register with their source objects, preferably using the Event_Advise_Notification method, so as learn of any InvalidateGroup events. These wire objects then respond by invalidating their own respective sink properties as indicated at block 1008. As indicated at block . 1009, the steps of blocks 1004–1008 are preferably repeated by the remaining wire and other program objects whose symbolic representations are located downstream of the fork relative to the root, thereby invalidating the respective data and control input terminals.

It should be understood that the program instructions or code that is incorporated into the application program is preferably configured such that steps 1004–1008 are completed at each of the downstream objects before resuming processing of (i.e., returning program control to) the wire object that was initially triggered and thus initiated the invalidation of the object input terminals.

Next, the wire object that was triggered in step 1002 preferably runs its event handler procedure or code as indicated at block 1010. This event handler procedure, which is generated by the program-development environment 310 and incorporated into the application program, preferably corresponds to the steps of FIGS. 6A and 6B described above. Thus, the wire object sets the respective property of its sink object with the value of the property that the wire object retrieved from its source object. In response to having its data input property up-dated, the sink object preferably transitions the state of that property, which had previously been invalidated at step 1004, to valid as indicated at block 1012. Preferably, the sink object changes the flag associated with the up-dated property to valid.

In response to changing an input property from invalid to valid, the sink object next determines whether its control input terminal is connected to a wire construct as indicated by decision block 1014 (FIG. 10B). If it is, the sink object then determines whether or not the value of its ControlIn property has been changed (e.g., toggled) as indicated by Yes arrow 1016 leading to decision block 1018. That is, the sink object, which may maintain a particular flag for this purpose, determines whether or not its ControlIn property has been changed. If not, the sink object preferably returns program control to the previous wire or other program object as indicated by No arrow 1020 leading to end block 1021. Alternatively, the sink object may run a wait loop at decision block 1018. If the sink object's ControlIn property has been toggled, it then determines whether all of its data input terminals are valid as indicated by Yes arrow 1022 leading to decision block 1024. If one or more input properties are still invalid, the sink object may wait until the remaining data input terminals are validated or, in the preferred embodiment, return program control to the previous wire or other program object as reflected by No arrow 1028 to end block 1021.

If the sink object's control input terminal is not connected to a wire construct, then processing moves from decision block 1014 directly to block 1024, by-passing block 1018, as shown by No arrow 1026.

If (or when) all of the sink object's data input terminals are valid, the sink object proceeds to execute its associated function as indicated at block 1030. Execution of the sink object preferably proceeds as described above in connection with FIG. 7. Thus, the sink object up-dates the properties associated with its data output terminals and issues its DataReady event. This DataReady event is typically a triggering event for any wire object whose construct is connected to a data output terminal of this sink object. Accordingly, this wire object and its sink property proceed to execute the steps of 1002–1030. That is, this process is repeated by the remaining wire and program objects downstream of the fork, thereby ensuring that the program objects do not execute their particular functions until all of their data input terminals have received valid data and their control input terminals, if connected, have been triggered.

For example, consider operation of the program object for the comparator symbol 908 (FIG. 9) of flow diagram 900. At run-time, a user interface corresponding to user form program object 408 is displayed on screen 235 (FIG. 2) of computer 200 to the end user. When the end user selects (e.g., mouse clicks) the command button image 950, the corresponding program object issues its DataReady event, which is the triggering event for the wire objects of constructs 914 and 920. As described above with steps 1002 and 1004 (FIG. 10A), whichever wire object first processes this DataReady event will set its sink property to invalid and direct the other wire object to do the same. The invalidation of data input terminals propagates throughout the flow diagram 900 as described above with steps 1006 and 1008.

As a result, the "x" input property of terminal 928 and the "y" input property of terminal 934 at comparator 908 are invalidated. The wire objects of constructs 914 and 920 then process the DataReady event, thereby causing the objects of indoor and outdoor temperature symbols 904, 906 to take a temperature measurement and pass these measurements via wire constructs 924, 930 to the data input terminals 928, 934 of comparator 908.

As each respective property at comparator 908 is up-dated with the new temperature measurement, comparator 908 changes the state of the property from invalid to valid as indicated by step 1012 (FIG. 10A) described above. Since comparator 908 does not have a wire construct connected to its control input terminal, it simply waits until both of its data input terminals 928, 934 have been up-dated (and thus validated) before executing, as indicated by blocks 1024 and 1030 (FIG. 10B). That is, as each data input terminal is up-dated and transitioned to the valid state, comparator 908 determines whether all of its other data input terminals are valid. Only after the last data input terminal is up-dated and validated does the object run its comparison function, provide an output on terminal 938 and issues its DataReady event. As shown, the branch detection mechanism of the present invention prevents objects, such as comparator 908, from executing their respective functions until all of their data input terminals have been up-dated. Accordingly, the branch detection mechanism avoids the generation of un-intended results by the application program.

It should be understood that object properties associated with data input terminals that are not connected to any wire constructs preferably remain valid at all times.

Recursion Blocking Mechanism

In some programming situations, the developer may wish to create a data/control is flow diagram having one or more circular paths. Such circular paths typically represent corresponding loop-back or feed-back conditions within the data/control flow diagram. Unless they are handled in a consistent and known manner, such loop-back or feed-back conditions can cause unintended consequences or results during execution of the corresponding application program. In addition, if left un-detected, circular paths, can also consume substantial computer resources, such as CPU and memory resources, even to the point of overwhelming the system. According to the present invention, a method is provided for efficiently handling circular paths specified within the data/control flow diagram.

Figure 11:
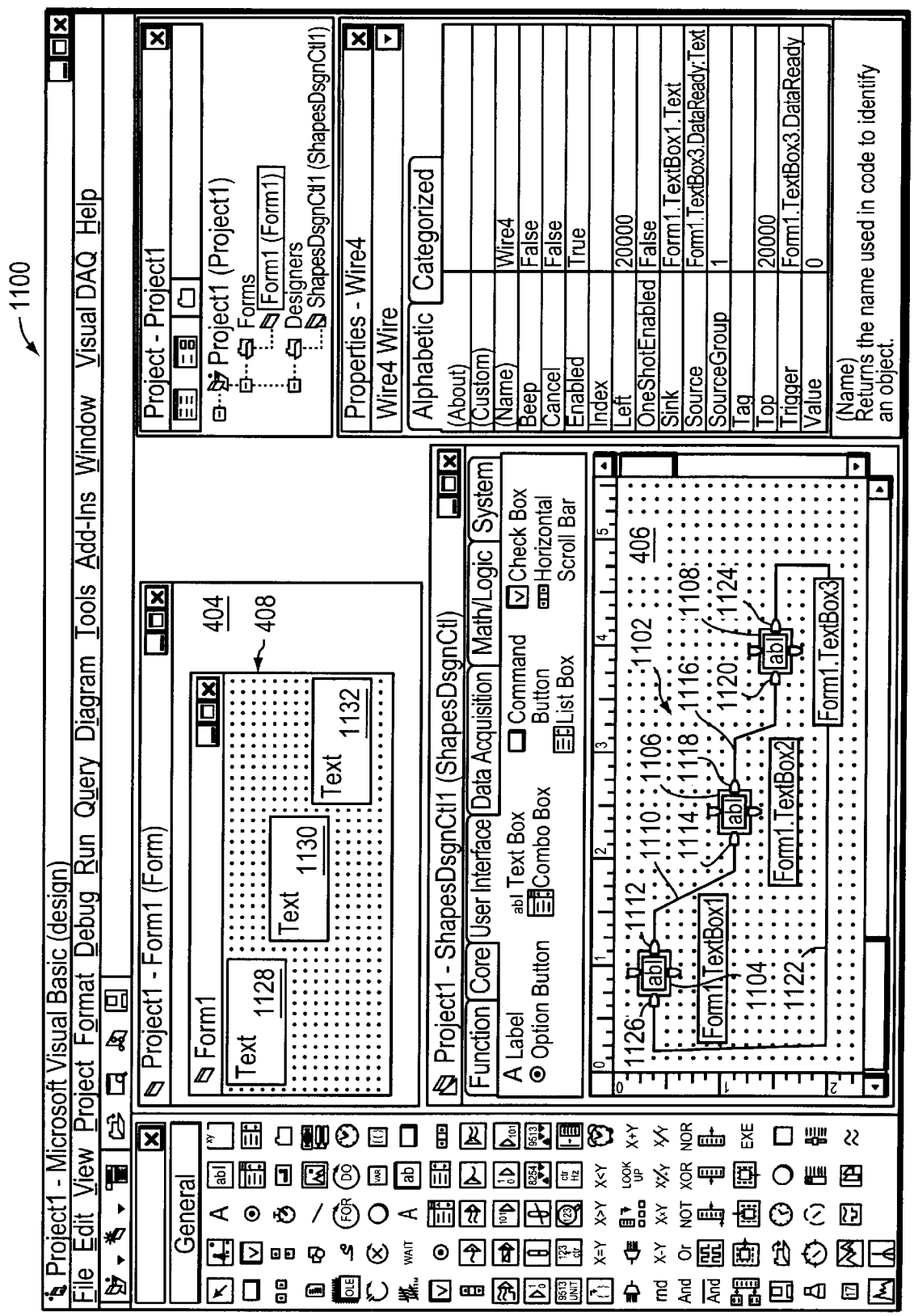
FIG. 11 is a preferred illustration of a graphical user interface having a circular flow diagram.

FIG. 11 is a preferred representation of a GUI 1100 generated by the program-development environment 310 (FIG. 3) on computer screen 235 (FIG. 2) that is similar to GUI 400 described above in connection with FIGS. 4A–4D. Within the designer window 406 is a data/control flow diagram 1102 that includes a circular path. In particular, the flow diagram 1102 includes three symbolic representations 1104, 1106 and 1108 each corresponding to a text box program object. Symbolic representations 1104–1108 are interconnected by a plurality of wire constructs. A first wire construct 1110 connects a data output terminal 1112 of symbol 1104 to a data input terminal 1114 of symbol 1106. A second wire construct 1116 connects a data output terminal 1118 of symbol 1106 to a data input terminal 1120 of symbol 1108. A third wire construct 1122 connects a data output terminal 1124 of symbol 1108 to a data input terminal 1126 of symbol 1104, thereby completing a circular path within the flow diagram 1102. Within the user form object 408 of form window 404 are images 1128, 1130 and 1132 that correspond to text box symbols 1104–1108.

Without some mechanism for handling the circular path of flow diagram 1102, running of the corresponding application program may overload the computer's processing and memory resources. More specifically, suppose an end-user were to run the application and enter some information, e.g., "hello", into a user interface element (not shown) corresponding to image 1128. As described above, the program object for symbol 1104 would issue its DataReady event indicating the presence of new data associated with its data output terminal 1112. In response, the program object for wire construct 1110 passes this information to the object of symbol 1106. The program object of symbol 1106, in turn, issues its DataReady event causing wire construct 1116 to pass the information to the object of symbol 1108. The program object of symbol 1108 then issues its DataReady event causing wire construct 1122 to return the information to the object of symbol 1104, thereby completing the circle. The object of symbol 1104 assumes that it has just received "new" data and, in response, issues its DataReady event, repeating the cycle described above until the computer's resources are eventually exhausted.

Figure 12:
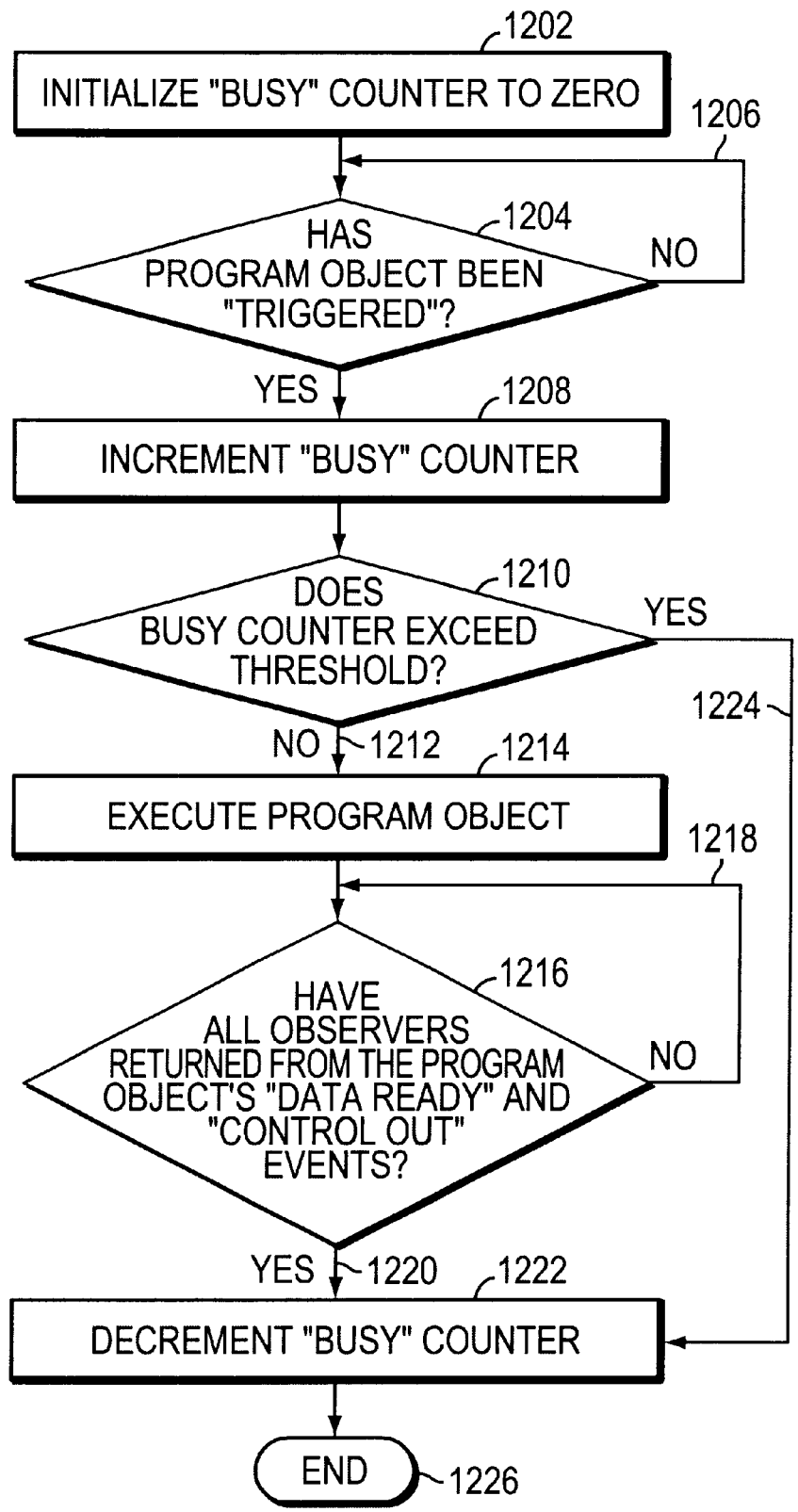

To avoid this problem, the program-development environment 310 of the present invention includes a novel method for efficiently handling circular paths specified within the data/control flow diagram. FIG. 12 is a flow diagram of the preferred steps of the method that are preferably performed by each program object represented in the flow diagram. First, the object initializes a "busy" indicator to some pre-determined value, as indicated at step 1202. In the illustrated embodiment, the busy indicator is a counter that may be initialized to "0". Specifically, each program object that is represented by a symbolic representation within a given flow diagram preferably establishes a busy counter (not shown) within memory 214 (FIG. 2). Next, the object waits to be triggered as indicated by decision block 1204 which has a No arrow 1206 that loops back on itself. As described above in connection with step 702 of FIG. 7, an object is triggered when one or more of its properties is up-dated typically by a connected wire object.

When the program object is triggered, it first increments the busy indicator (e.g., the counter), preferably by "1", as indicated by block 1208. The object then determines whether the value of its busy counter exceeds some predetermined threshold as indicated by decision block 1210. In the preferred embodiment, the threshold is set to "1". If the busy counter does not exceed the threshold, the object then executes its respective function as indicated by No arrow 1212 leading to block 1214, which preferably corresponds to steps 704–718 of FIG. 7 described above. That is, the object places its output data on its data output terminal and issues its DataReady and its ControlOut events. As described above, other objects, such as wire program objects, may respond to the DataReady and ControlOut events. As indicated at decision block 1216 and No arrow 1218 which loops back to block 1216, the object waits until such "observers" have returned from the DataReady and Control out events.

Specifically, upon issuing its DataReady event, program control (e.g., processing by the CPU 210 (FIG. 2) shifts from executing the steps of the program object to executing the steps corresponding to the event handler procedure that is triggered by the object's DataReady event. When this event handler procedure is finished, program control then returns to the object so that its execution may be completed. So that program control may be returned to the appropriate location within the steps corresponding to the program object, a pointer to the location is typically pushed onto a stack within memory 214 (FIG. 2). When the event handler procedure or code has finished executing, this pointer is popped off of the stack and processing resumes at the appropriate location. As described above, execution of the event handler procedure or code may result in the issuance of one or more events (e.g., Action, Done, etc.) and it may be interrupted so that program instructions or code triggered by these events may be executed.

When the observers return from the object's DataReady and ControlOut events, the object then decrements its busy counter, preferably by "1", as indicated by Yes arrow 1220 leading to block 1222. Upon decrementing the busy counter, processing is complete as indicated by End block 1226.

Referring again to step 1210 in which the busy indicator is tested, if the value of the busy indicator exceeds the threshold, then the object does not execute and, instead, simply decrements its busy counter, as indicated by Yes arrow 1224 leading from decision block 1210 to block 1222. That is, if the busy indicator returns a busy indication, then execution of the corresponding object is by-passed (e.g., the object is shortcircuited) and the object simply decrements its busy indicator. As described above, upon decrementing the busy counter, processing by the object is complete as indicated by End block 1226. To avoid conflicts between the incrementing and testing of the busy indicator, the steps of blocks 1208 and 1210, are preferably performed by the computer system 200 (FIG. 2) as an atomic operation. An atomic operation refers to some unitary action that is essentially indivisible (i.e., the steps are not interrupted). Those skilled in the art to which the present invention pertains are aware of techniques for ensuring that particular programming instructions or steps are treated as atomic operations.

For computer systems that support multiple threads, semaphores may be used to prevent a given object that was triggered by a first thread from being re-triggered by a different thread. Semaphores are well-known techniques for coordinating or synchronizing activities.

Returning to the example of FIG. 11, when information, e.g., "hello", is entered by the end user into the user interface element of image 1128, the object of symbol 1104, which corresponds to this user interface element, executes the steps of FIG. 12. In particular, the entry of information triggers the object as indicated by step 1204. Accordingly, the object increments its busy counter, which was initialized to "0" at step 1202, by "1" so that its busy counter is now set to "1". Since the value of the busy counter does not exceed the threshold of "1", the object of symbol 1104 executes its functionality as indicated by steps 1210 and 1214. In particular, the object places the newly entered information on its data output terminal 1112 and issues its DataReady event. The wire object of construct 1110 responds to the DataReady event and passes this information to the data input terminal 1114 of the object of symbol 1106. As described above, this information is eventually returned to the object of symbol 1104 at its data input terminal 1126 by wire construct 1122.

In response, the object of symbol 1104 assumes it has been triggered, as indicated at step 1204, and thus increments its busy counter (again by "1") and tests it, as indicated at steps 1208 and 1210. Since the busy counter is now at "2", exceeding the threshold of "1", the object decrements the counter as indicated by Yes arrow 1224 leading to step 1222, instead of executing again as might otherwise occur without the recursion or reentry blocking mechanism of the present invention. As a result, program control returns first to the object of wire construct 1122 so that it may complete its execution, and then to the object of image 1108 so that it may complete its execution. Program control similar returns to wire construct 1116, and then to object 1106. Eventually, program control returns to the wire object of construct 1110, which completes its execution, thereby returning control to the object of symbol 1104 following the issuance of its DataReady event. In other words, the result of decision block 1216 is now yes, and thus the object of symbol 1104 can decrement its busy counter from "1" back to zero. As shown, with the method of the present invention, the re-triggering of the object of symbol 1104 (i.e., triggering before the object has completed execution from an earlier triggering) does not result in an overloading of the processing or memory resources of the computer 200 (FIG. 2).

It should be understood that the steps of FIG. 12 may be executed by each of the wire program object's of the respective flow diagram as well.

Symbolic Representations for Repeating Steps

When creating application programs, developers often include certain programming steps that are to be repeated many times. Rather than entering such steps over and over again, many programming languages include command structures that automatically repeat certain identified steps. For example, with Visual Basic from Microsoft, developers can enter specific keyword commands within the code window to repeat certain statements. In particular, Visual Basic allows developers to create what are known as Do Loops and For Loops. A Do Loop executes certain code over and over again until some condition is met. Typically, the syntax of a Do Loop appears as follows:

Do

{statements}

Loop Until/While condition.

where "{statements}" are the particular code statements that are to be repeated and condition refers to the condition that stops the loop. A Loop Until condition checks the condition after running through the loop and repeats only if the condition is FALSE. A Loop While condition also checks the condition after running through the loop but repeats only if the condition is TRUE. Do Loops may also be configured to check the condition before entering the loop.

A For Loop is used when the developer knows precisely how many times the loop should repeat. Unlike a Do Loop, a For Loop uses a variable called a counter that increases or decreases in value during each repetition of the loop. The syntax of a For Loop typically appears as follows:

For counter=start To end {Step increment}

{statements}

Next {counter}

When executing the For Loop, the application program sets the counter equal to the specified start value and tests to see whether the counter is greater than the specified end value. If so, the loop is exited. If not, the statements are executed and the counter is incremented by the specified increment value (or by "1" if no value was specified). The loop then repeats again checking to see if the counter has surpassed the end value (in either direction).

According to the present invention, the program-development environment 310 (FIG. 3) is further configured to incorporate program code within the application program being developed that repeats certain statements or steps (i.e., the program includes loop structures) in response to graphical, as opposed to textual, inputs from the developer. In particular, as described below, the program-development environment 310 includes a plurality of program objects having corresponding symbolic representations that may be caused to appear in the designer window 406 of the GUI 400. These symbolic representations may be connected with other symbols within the designer window 406 using one or more wire constructs in order to define a loop. However, in order to present a simplified and refined flow diagram within the designer window, the loop preferably appears as an acyclic branch of the flow diagram. That is, although the branch terminates (i.e., there is no wire construct from the end of the branch back to the main flow diagram), it nonetheless is repeatedly executed at application run-time. At the end of the branch may be a Break symbol as described below.

Figure 13:
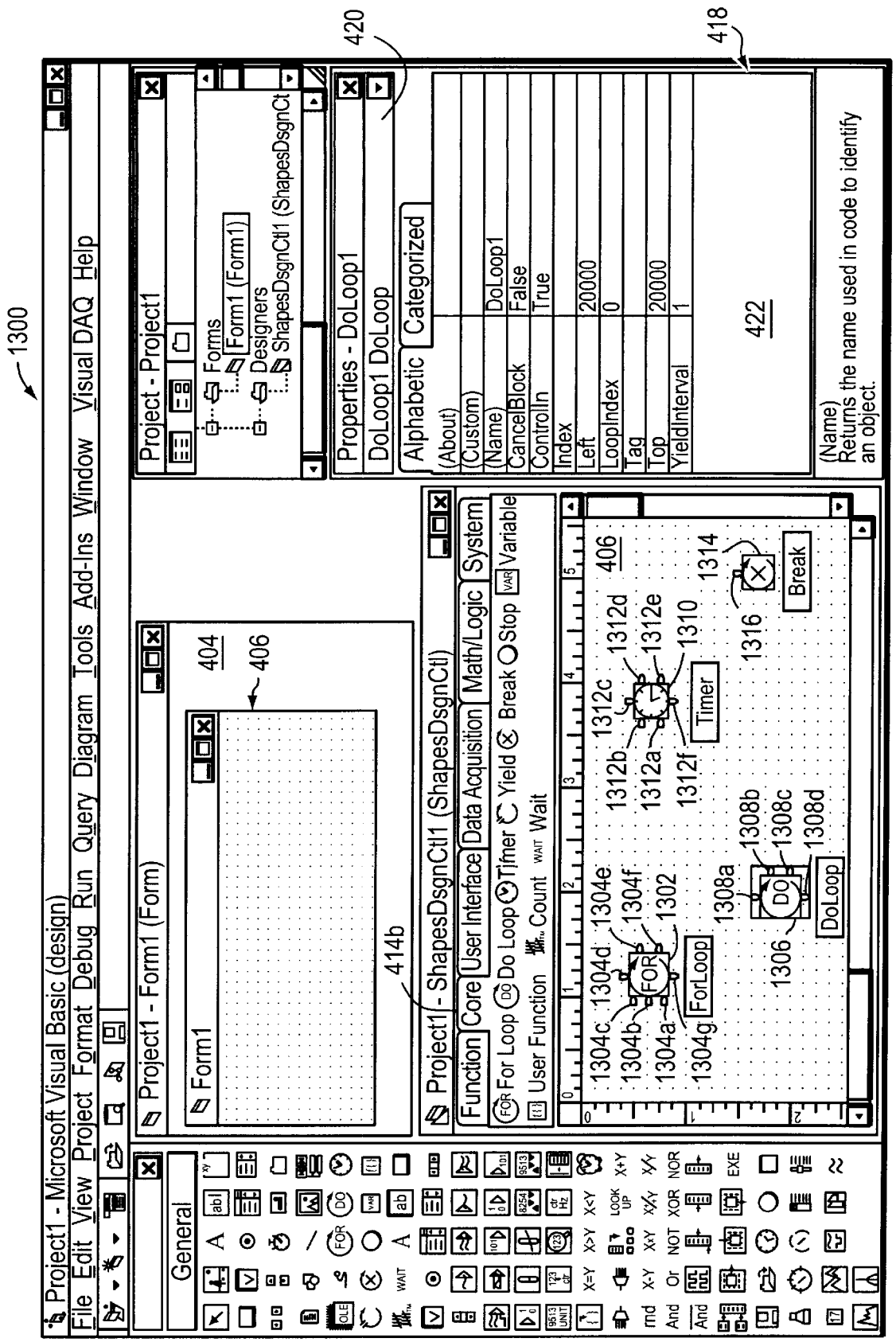
FIGS. 13 and 15 are preferred illustrations of graphical user interfaces depicting symbols used to create programming loops.

FIG. 13 is a preferred representation of a GUI 1300 generated by the program-development environment 310 (FIG. 3) on computer screen 235 similar to GUI 400 (FIG. 4A) described above. The Core sub-toolbar 414b of the designer window 406 includes a plurality of icons that correspond to program objects for use in performing loop-type functions, among others, within the application program being developed. In particular, sub-toolbar 414b includes icons for a For Loop, a Do Loop, a Timer, and a Break control, among others. Each of these icons, in a similar manner as described above, corresponds to an object class from which one or more program objects or controls may be instantiated. As described herein, these loop controls can generate multiple outputs from a single input.

Within the designer window. 406 are preferred symbolic representations of several program objects corresponding to icons of Core sub-toolbar 414b each having one or more terminals for connecting one or more wire constructs. A For Loop symbol 1302, for example, includes a start index data input terminal 1304a, an end index data input terminal 1304b, a step value data input terminal 1304c, a control input terminal 1304d, a loop index data output terminal 1304e, an error data output terminal 1304f and a control output terminal 1304g. The For Loop object of symbol 1302 preferably incorporates the ControlOut, DataReady, ErrorOut and RunBlock events described above. The For Loop object of symbol 1302 basically runs a branch of the flow diagram connected to its loop index output terminal 1304e repeatedly until the end index specified at input terminal 1304b is reached. In particular, starting with the start index specified at input terminal 1304a, which can be initialized to "0" each time the respective application program starts-up, the For Loop object issues its DataReady event and outputs the current loop index value from terminal 1304e (e.g., 1, 2, 3, etc.) using the step value specified at terminal 1304c (e.g., 1) to count up (or down) to the end index specified at terminal 1304b.

A Do Loop symbol 1306 preferably includes a control input terminal 1308a, a loop index data output terminal 1308b, an error data output terminal 1308c and a control output terminal 1308d. The Do Loop object also incorporates the ControlOut, DataReady, ErrorOut and RunBlock events. The Do Loop object of symbol 1306 basically runs a branch of the flow diagram connected to its loop index output terminal 1308b repeatedly until some condition, which is preferably specified graphically by one or more symbols connected to a Break symbol, which is described below, is met. In particular, with its loop index property preferably initialized to "0" each time the respective application program starts-up, the Do Loop object repeatedly issues its DataReady event and outputs its loop index value from terminal 1308b until the graphically specified condition is met and the Do Loop object is stopped.

A Timer symbol 1310 preferably includes an interval data input terminal 1312a, a frequency input terminal 1312b, a control input terminal 1312c, a loop index data output terminal 1312d, an error data output terminal 1312e and a control output terminal 1312f. Like the Do Loop object, the Timer object of symbol 1310 also runs a branch of the flow diagram connected to its loop index output terminal 1312d repeatedly until some specified condition is met. In particular, with its loop index property preferably initialized to "0" each time the respective application program starts-up, the Timer object issues its DataReady event and outputs its loop index value from terminal 1312d each time the value specified at its interval data input terminal 1312a (which may be in milliseconds) elapses. The Timer object then preferably increments its loop index property by "1". The value specified at the frequency data input terminal 1312b preferably specifies the number of timer events per second.

A Break symbol 1314 preferably has a control input terminal 1316. As indicated above, a Break object is used to stop execution of a corresponding loop object (e.g., Do Loop, For Loop or Timer objects) upon satisfaction of some specified condition. The Break object preferably terminates the execution of the first up-stream loop object to which the symbolic representation 1314 of the given Break object is connected when its control input property is triggered (e.g., changed). For example, a Break object can be used to stop execution of a loop when a particular value generated during the loop sequence exceeds some threshold. In this case, the control input terminal 1316 of a Break object 1314 may be connected to the data output terminal of a symbol whose corresponding object compares two values and outputs a TRUE indication on the connected data output terminal if the first value (the value generated within the loop sequence) is greater than the second value (the threshold). This loop will continue to run until the value exceeds the threshold. At this point, the comparison symbol will output a TRUE indication that is provided to the Break symbol by a corresponding wire construct. Upon having its control input property triggered, the Break object stops execution of the first up-stream loop object (i.e., Do Loop, For Loop or Timer objects).

The properties (or at least those properties that are declared public and thus may be changed by a developer) of the For Loop, Do Loop, Timer, and Break objects may each be selectively displayed by the program-development environment 310 (FIG. 3) in the properties window 418 by selecting the desired object from the pull-down object list 420. The specific properties displayed within the corresponding properties window 422, moreover, may be modified and edited by the developer, thereby changing the properties of the respective object residing in the form window 404.

The use of the loop symbols and corresponding objects may best be understood through an example. FIGS. 14A–D are preferred representations of a GUI having a flow diagram incorporating a loop. Suppose that a developer wishes to create an application (or a process thereof) for summing a sequence of numbers and stopping if the sum exceeds some specified value. Using the icons of designer toolbar 414, the developer preferably creates a data/control flow diagram within the designer window 406 of the GUI 400 for performing such steps.

FIGS. 14A–D are preferred illustrations of a GUI 1400 similar to GUI 400 described above showing some of the steps followed in creating such an application program. More specifically, within designer window 406 of GUI 1400 is a data/control flow diagram 1402 of the application program. The flow diagram 1402 includes a number of symbolic representations interconnected by a plurality of wire constructs. The symbols, moreover, correspond to respective program objects that have been instantiated and added to the form window 404 as described above. The symbols include a command button symbol 1404 having a data output terminal 1406, a For Loop symbol 1408 having a control input terminal 1410a and a loop index output terminal 1410b, first and second label symbols 1412 and 1414, each having corresponding data input terminals 1416 and 1418, respectively, and an addition symbol 1420 having an "x" data input terminal 1422a, a "y" data input terminal 1422b, a data output terminal 1422c and a control output terminal 1422d. Flow diagram 1402 further includes an X>Y comparator symbol 1424 having an "x" data input terminal 1426a, a "y" data input terminal 1426b, and a TRUE data output terminal 1426c that is up-dated when the value of "x" is greater than the value of "y". Comparator 1424 may also include a FALSE data output terminal 1426d that is updated if "x" is not greater than "y".

Flow diagram 1402 further includes a text box symbol 1428 having a data output terminal 1430, and a variable symbol 1432 having data input, control input, data output, error output and control output terminals 1434a–e. A Variable symbol, such as symbol 1432, is typically used to read a new value on its data input terminal 1434a and, upon triggering of its ControlIn property (provided its control input terminal is wired) to pass that value to its data output terminal 1434c and issue a DataReady event. Thus, variable objects can save a data value for later use by the application program. Flow diagram 1402 further includes a Break symbol 1436 having a control input terminal 1438. In response to adding the command button, labels and text box symbols 1404, 1412, 1414 and 1428, which are all user interface components, the program-development environment 310 (FIG. 3) places corresponding button, labels and text box images 1440, 1442, 1444, and 1446, respectively, in the user form program object 408 of the form window 404.

The symbolic representations within the designer window 406 are also interconnected by a plurality of wire constructs, thereby forming the data/control flow diagram 1402 of the corresponding application program. In particular, the data output terminal 1406 of command button symbol 1404 is connected to the control input terminal 1410a of For Loop 1408 by a first wire construct 1446. Loop index output terminal 1410b of For Loop 1408 is connected to the data input terminal 1416 of first label 1412 by a second wire construct 1448, and also to the "x" data input terminal 1422a of the addition symbol 1420 by a third wire construct 1450. Data output terminal 1422c at addition symbol 1420 is connected to the data input terminal 1418 of second label 1414 by a fourth wire construct 1452, to the "x" data input terminal 1426a of comparator 1424 by a fifth wire construct 1454, and to the data input terminal 1434a of variable 1432 by a sixth wire construct 1456.

The control output terminal 1422d of addition symbol 1420 is connected to the control input terminal 1434b of variable 1432 by a seventh wire construct 1458, and the data output terminal 1434c of variable 1432 is connected to the "y" data input terminal 1422b of the addition symbol 1420 by an eighth wire construct 1460. A ninth wire construct 1462 connects the data output terminal 1430 of text box 1428 to the "y" data input terminal 1426b at the comparator 1424. The TRUE data output terminal 1426c of comparator 1424 is connected to the control input terminal 1438 of the Break symbol 1436 by a tenth wire construct 1464.

Figure 14A:
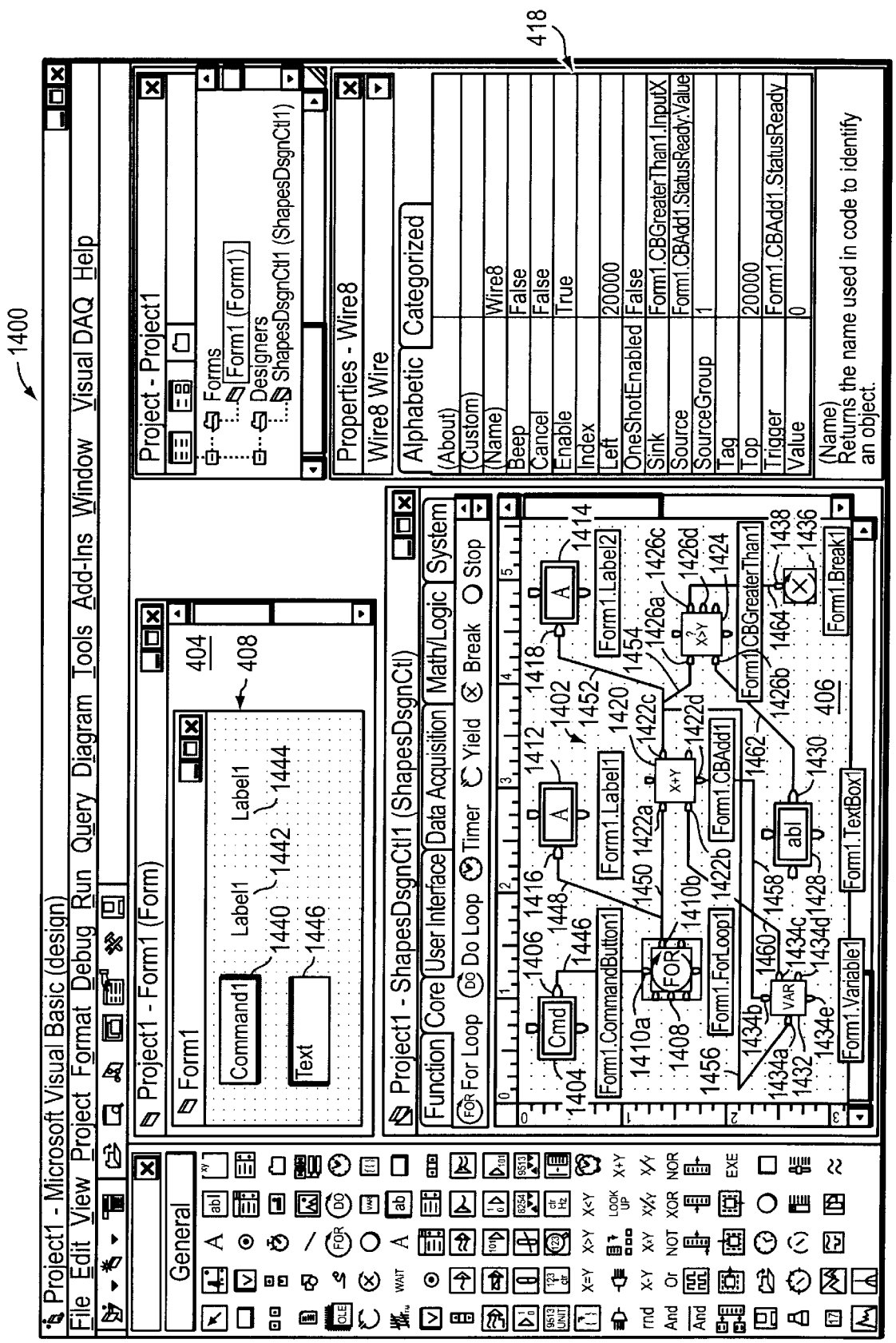
FIGS. 14A–D are preferred illustrations of a graphical user interface having an exemplary flow diagram utilizing a loop symbol.
Figure 14B:
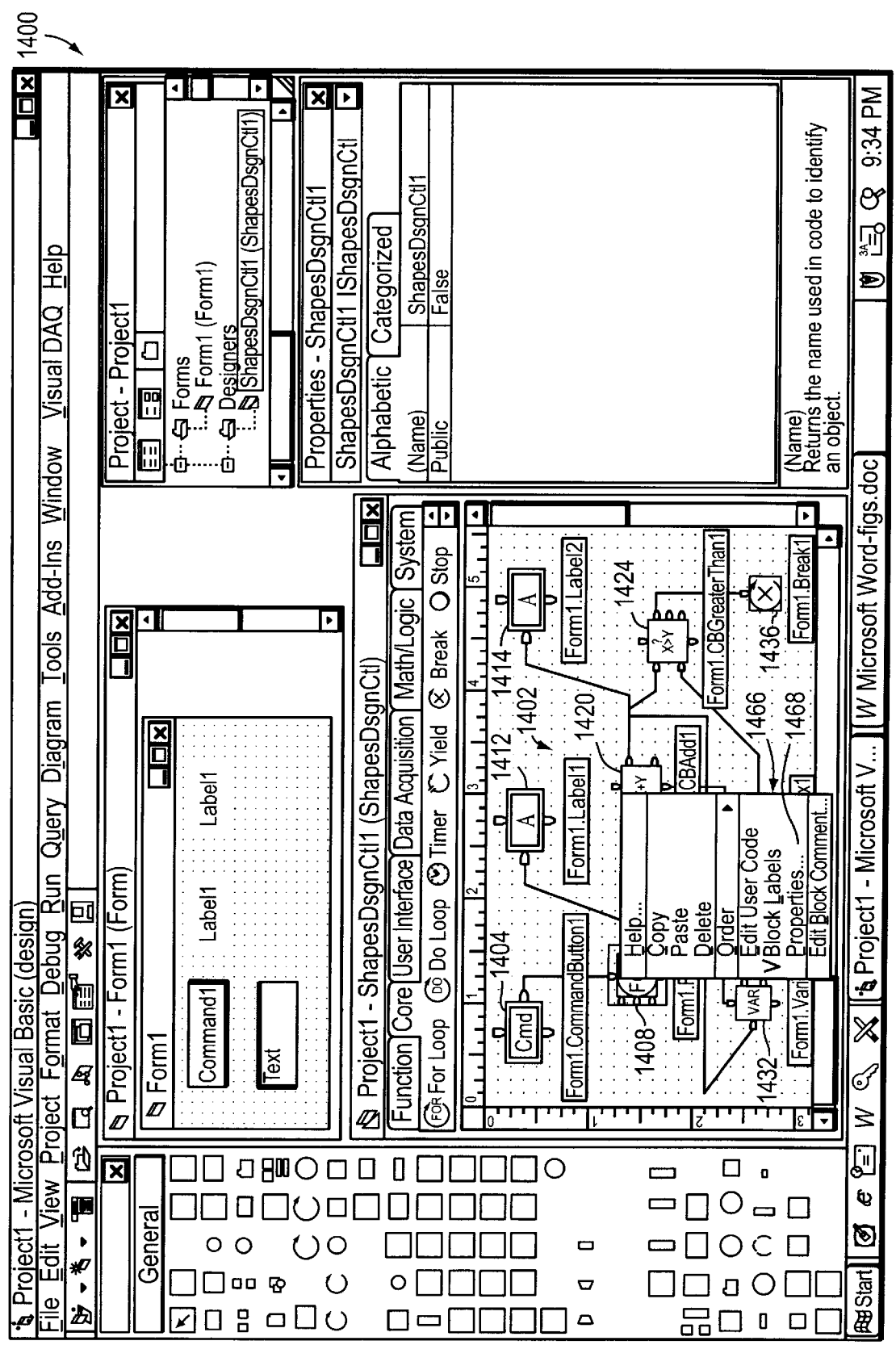

The step value, end index and start index input terminals of For Loop 1408 are not connected to any wire constructs. Nonetheless, the developer may edit the values for any of these properties prior to running the application program. To edit an object's properties, the developer may display the properties of the selected program object in the properties window 418 in the manner described above. The program-development environment 310, however, preferably supports at least one or more additional ways of editing an object's properties. In particular, as shown in FIG. 14B, when the developer executes a "right mouse click" on a selected symbol, such as For Loop symbol 1408, the program-development environment 310 causes a command pop-up menu 1466 to appear on GUI 1400. Command window 1466 displays a series of commands that may be performed on the selected object symbol, e.g., For Loop 1408. One of these commands is a Properties command 1468.

Figure 14C:
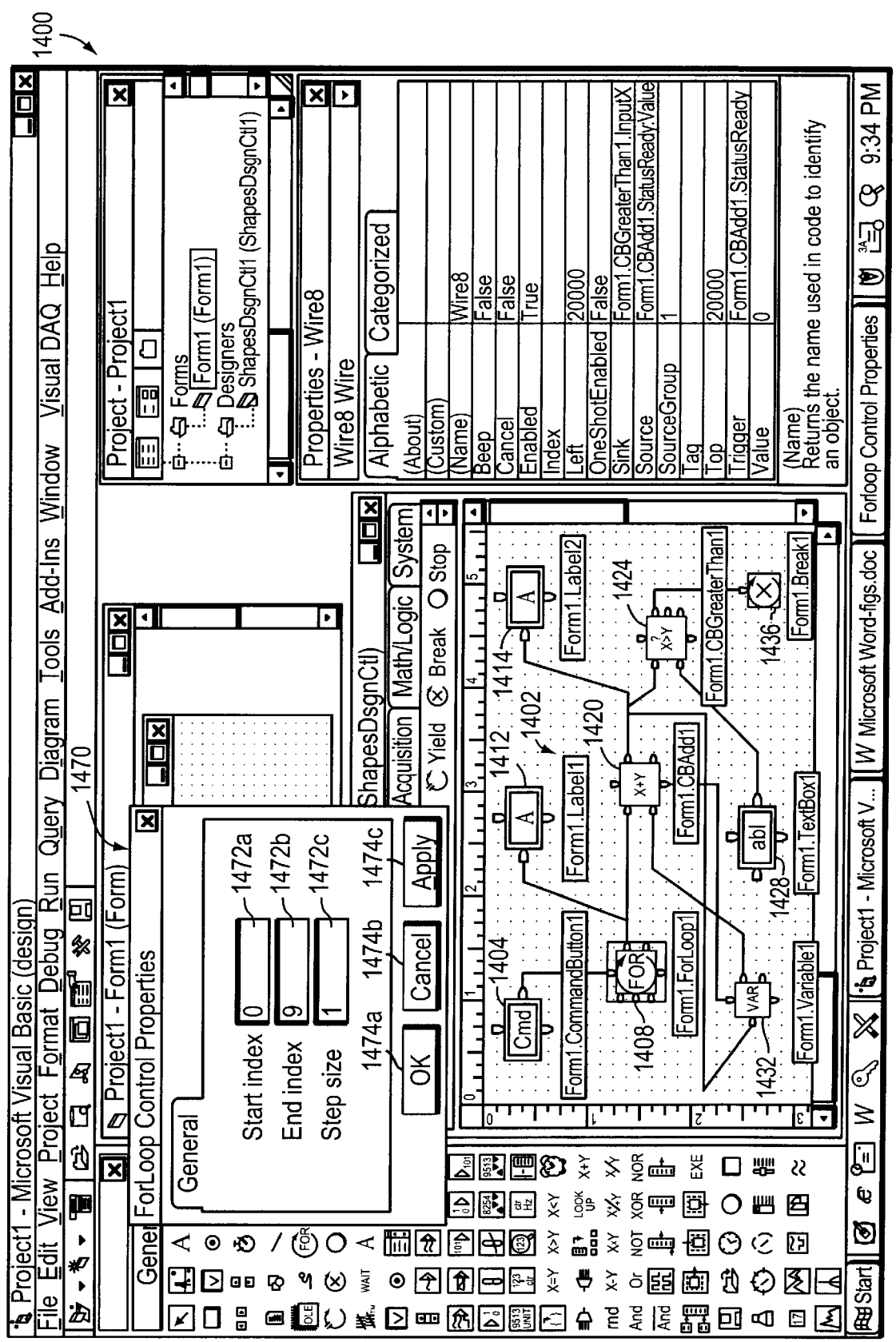

As shown in FIG. 14C, by selecting (e.g., clicking) the properties command 1468 (FIG. 14B), the developer causes the program development environment 310 to display a properties page dialog window 1470 on GUI 1400 for the For Loop 1408. This properties page dialog window 1470 includes a plurality of entry fields, such as start index field 1472a, an end index field 1472b and a step size field 1472c, for reviewing and editing one or more properties of the For Loop. Properties page dialog window 1470 also includes OK, Cancel and Apply command buttons 1474a–c, respectively, for use in accepting, canceling and applying the values specified in fields 1472a–c to the respective object, e.g., For Loop 1408. For example, the developer may set the start index of field 1472a to "0", the end index 1472b to "9", and the step size 1472c to "1". He or she may alternatively accept the default values specified in one or more of these fields. It should be understood that these values are for illustrative purposes only.

Figure 14D:
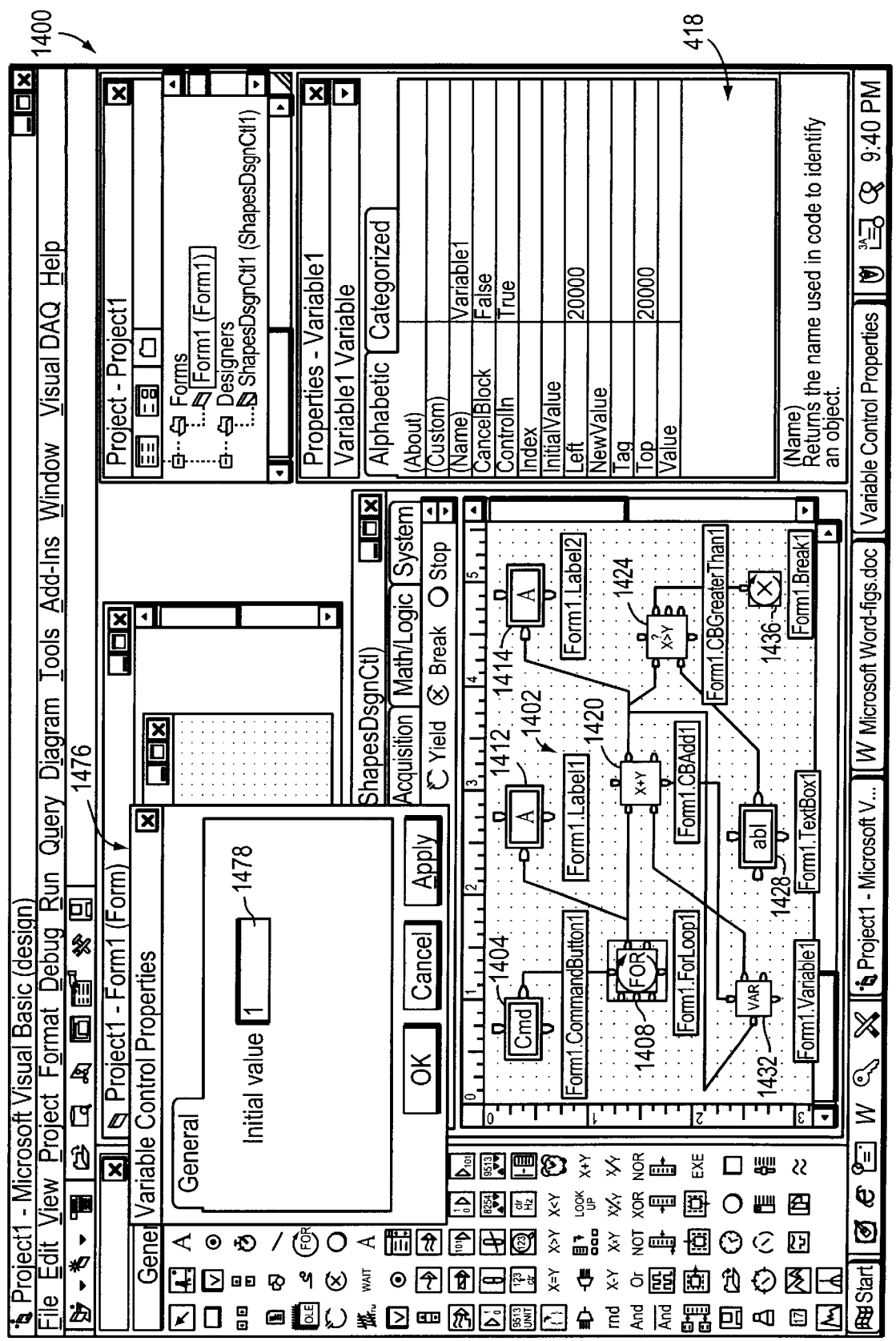

Next, the developer may set the properties of the variable object of symbol 1432. That is, the developer may "right-click" symbol 1432 (FIG. 14A) causing the program-development environment 310 to display a command pop-up menu (not shown) for the variable object. The developer may then select the properties command from this pop-up menu. As shown in FIG. 14D, the program-development environment 310 responds by displaying a properties dialog window 1476 for the variable object. Properties dialog window 1476 has only an initial value field 1478, which the developer may set to an initial value of "1". As shown, the properties displayed in the corresponding properties dialog windows for various program objects may be some sub-set of the properties defined by the respective object, rather than the entire set of properties for the object. This prevents developers from inadvertently editing certain object properties that may produce un-intended consequences during application run-time. Indeed, in a preferred embodiment of the present invention, the program-development environment 310 may suppress the display of properties window 418, and limit the editing of object properties through the respective dialog windows.

At this point, the developer is done and the application program may be run. Referring to FIG. 14A, at run-time, a user interface similar to user form program object 408 is displayed on the screen of the computer. The end user may enter some limit number (e.g., "12") in the text box 1446 and then, to get the program going, "press" the command button 1440 (e.g., with a mouse click). This causes wire construct 1446 to toggle the ControlIn property of the For Loop 1408 causing it to place its first loop index (e.g., "0" ) on its data output terminal 1410b and issue its DataReady event. In response, wire constructs 1448 and 1450 pass this index value to first label 1412, and to the "x" input of addition symbol 1420. The addition symbol 1420 adds this "x" value to its "y" value, which may, by default, initially be set to "0", places the sum on its data output terminal 1422c and issues its DataReady event. Wire constructs 1452, 1454 and 1456 respond to the addition symbol's DataReady event by passing the sum to second label 1414, comparator 1424 and variable 1432, respectively. Addition symbol 1420 then issues its Control Out event, which causes wire construct 1458 to toggle the ControlIn property of variable 1432. In response, variable 1432 passes the sum received at its data input terminal 1434a to its data output terminal 1434c and issues its DataReady event. Wire construct 1460, in turn, passes the data output value from variable 1432 to the "y" data input terminal 1422b of addition symbol 1420.

Before running its function again, addition symbol 1420 waits for new data on its "x" data input terminal 1422a (e.g., the next loop index value). When the next loop index value (e.g., "1") is received at the addition symbol 1420, it adds the two values together and places the new sum on its data output terminal 1422c. These steps are repeated for each new "x" and "y" input received at the addition symbol 1420. Meanwhile, the comparator symbol 1424 is determining whether any sum from addition symbol 1420 exceeds the value specified by the end user in text box 1446 (e.g., 12). If so, comparator 1424 places a TRUE indication on its output terminal 1426 c and issues its DataReady event. In response, wire construct 1464 toggles the ControlIn property of Break symbol 1436. Upon being triggered, Break symbol 1436 stops execution of the first "up-stream" loop-type object. In this case, the first up-stream loop symbol is For Loop 1408. Accordingly, when Break symbol 1436 is triggered it stops execution of For Loop 1408, thereby stopping the application program. Within label images 1442 and 1444 will be the final loop index value from For Loop 1408 and the final sum from addition symbol 1420.

In addition to generating application program code having loop structures in response to graphical inputs by the developer, the program-development environment 310 of the present invention may also generate event handler procedures corresponding to the loop structures in response to textual inputs by the developer. More specifically, the developer may select a desired loop symbol from a given data/control flow diagram and specify a corresponding event handler procedure through textual inputs.

Figure 15:
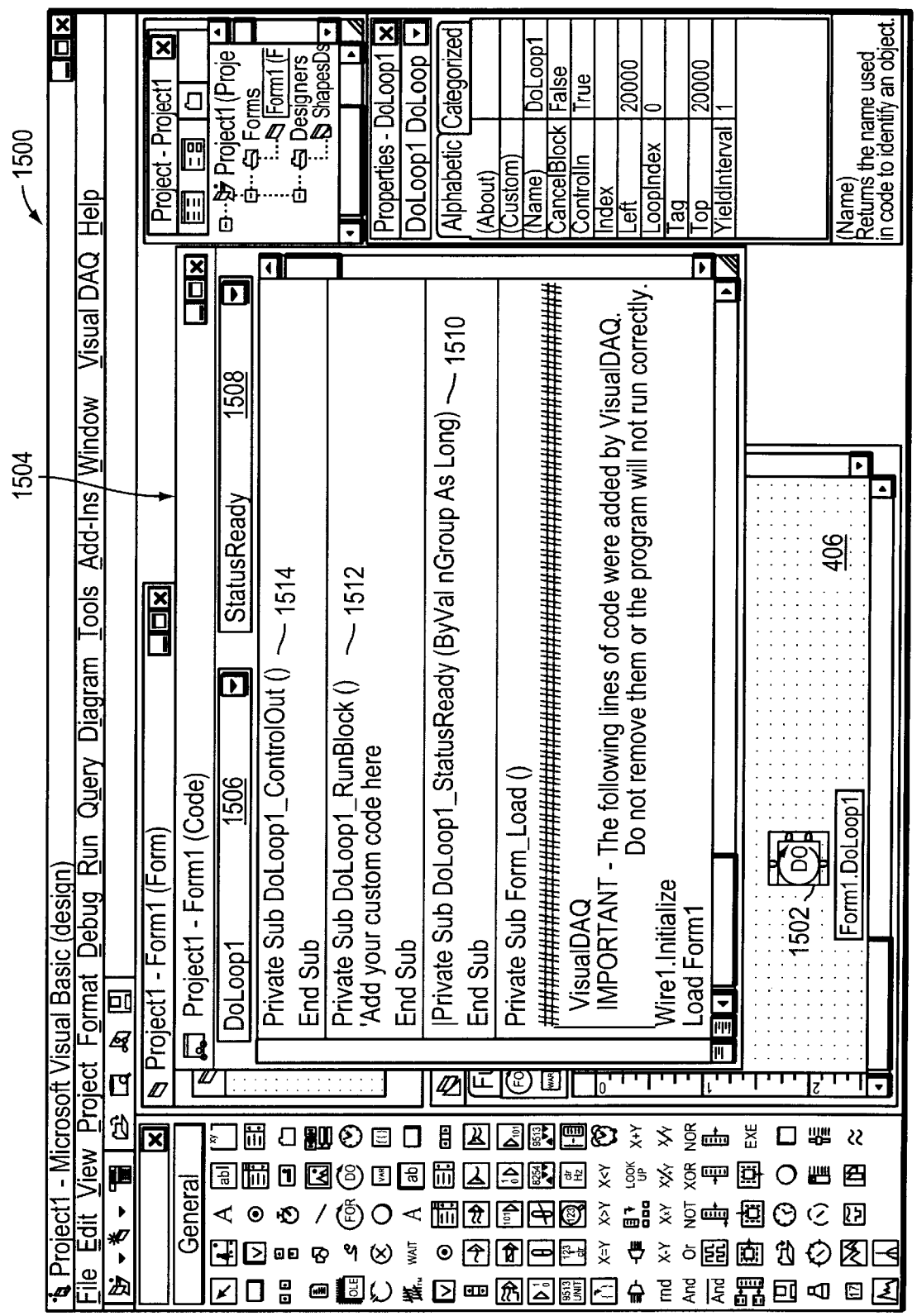

FIG. 15 is a preferred representation of a GUI 1500 generated by the program-development environment 310 (FIG. 3) on computer screen 235 (FIG. 2) that is similar to GUI 400 described above in connection with FIGS. 4A–4D. Within the designer window 406 is a Do Loop symbol 1502. By selecting (e.g., double-clicking with mouse 230 (FIG. 2), the Do Loop symbol 1502, the developer may cause a code window 1504 to be displayed on the screen. As described above in connection with FIGS. 8A and 8B, the code window 1504 includes a pull-down object box 1506, which contains a list of all of the program objects currently residing in the form window 404, including the Do Loop. The code window 1504 further includes a pull-down procedures/events box 1508, which contains a list of all of the procedures and events supported by the selected program object shown in object box 1506. By selecting a particular procedure or event from box 1508, the code window 1504 is positioned at the entry point of the respective procedure or event.

As described above, the Do Loop object includes the RunBlock, StatusReady and ControlOut events, among others. Accordingly, the developer can generate entry points within the code window 1504 for each of these events. In particular, by selecting the StatusReady event from the procedures/events box 1508, the developer can cause the program-development environment 310 to generate an entry point 1510 for this event within the code window 1504. Below this entry point, the developer may insert, review and edit one or more statements that are compatible with the underlying programming language, e.g., Visual Basic. In response, the program-development environment 310 generates program code that runs in response to the occurrence of the respective event, e.g., StatusReady. The developer may similarly insert statements that are to be run in response to other events issued by the object of the Do Loop symbol 1502. For example, a second insertion point 1512 can be created within code window 1504 for the Do Loop's RunBlock event, and a third insertion point 1514 can be created for the Do Loop's ControlOut event. Unlike the prior art graphical programming systems which do not allow developers to specify event-handlers for loop related images textually, the program-development environment of the present invention allows developers to switch between graphical and textual programming paradigms for the specification of event handlers.

Other Program Object Classes Having Symbolic Representations

Figure 16:
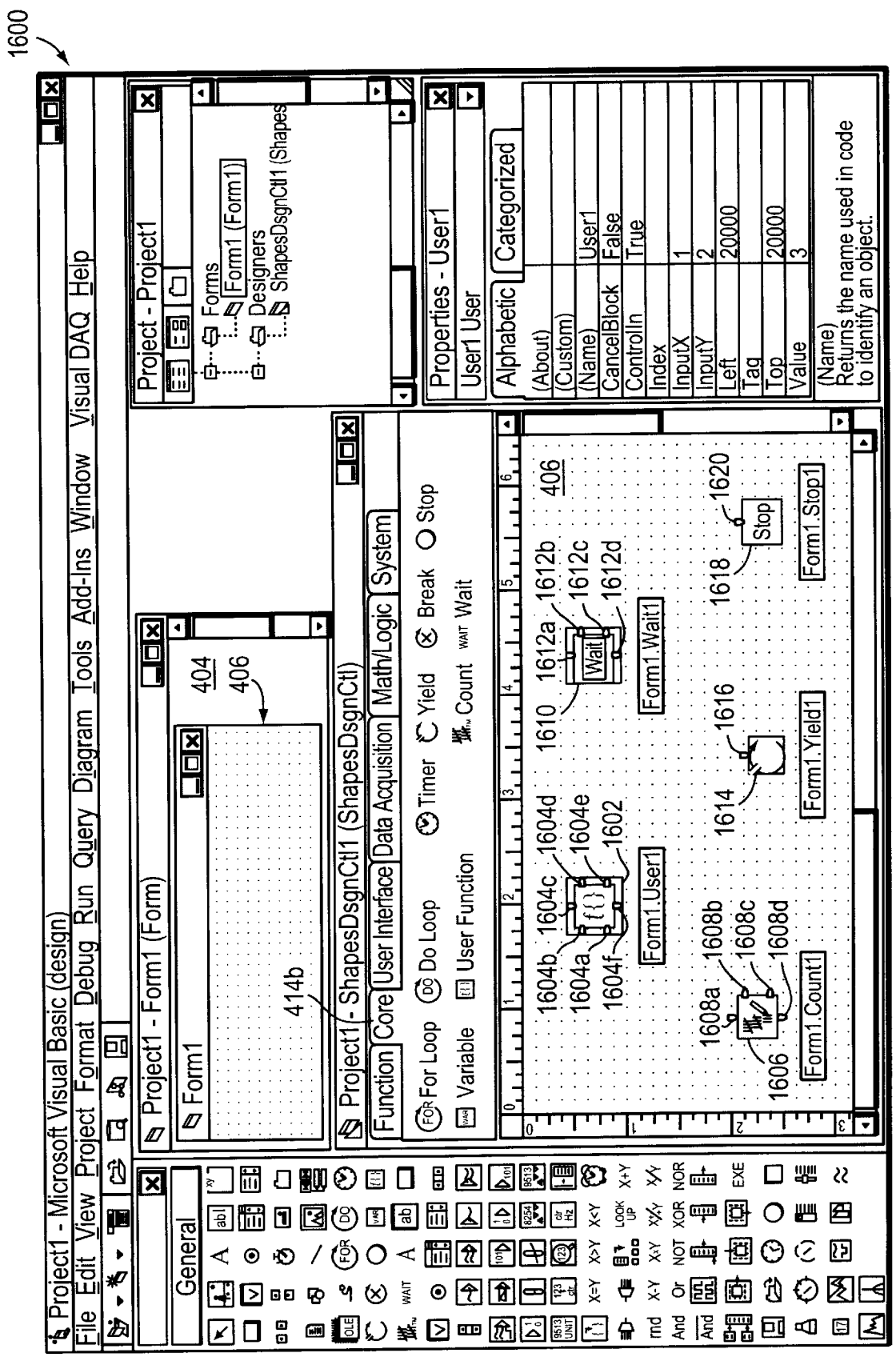
FIG. 16 is a preferred illustration of a graphical user interface depicting additional programming symbols of the present invention.

The program-development environment 310 (FIG. 3) of the present invention preferably includes additional program object classes that may be used in creating application programs. Icons corresponding to these additional program objects may be included within the designer toolbar 414 (FIG. 4A). Referring to FIG. 16, which is a preferred representation of a GUI 1600 having similar elements and features as GUI 400 (FIG. 4A), Core sub-toolbar 414b also includes icons, in addition to those described above, for a Yield control, a Stop control, a User Function control, a Count control and a Wait control. Each of these icons, in a similar manner as described above, corresponds to an object class from which one or more program objects may be instantiated.

For example, as shown in designer window 406, a User Function symbol 1602 preferably has at least two data input terminals 1604a, 1604b (e.g., corresponding to input variables "x" and "y", respectively), a control input terminal 1604c, a data output terminal 1604d, an error data output terminal 1604e and a control output terminal 1604f. The User Function object of symbol 1602 preferably incorporates the ControlOut, DataReady, RunBlock and StatusReady events described above. The User Function object is typically utilized by a developer to incorporate a custom event handler that occurs in response to the RunBlock event of the User Function object. The custom event handler is preferably defined through textual inputs entered in the code window 800 (FIG. 8A) at an insertion point corresponding to the RunBlock event of the respective User Function object. The custom event handler may or may not utilize the values of the "x" and "y" data input terminals 1604a, 1604b of the symbol 1602. It also may or may not generate some new value that may be passed on its data output terminal 1604d. In the illustrative embodiment, the custom event handler complies with the syntax and command structure of Visual Basic.

A Count symbol 1606 preferably has a control input terminal 1608a, a data output terminal 1608b, an error data output terminal 1608c and a control output terminal 1608d. The Count object of symbol 1606 performs a count operation preferably starting at "0" and incrementing by "1" each time its ControlIn property is triggered by a wire construct connected to its control input terminal 1608a.

A Wait symbol 1610 preferably has a control input terminal 1612a, a busy data output terminal 1612b, an error data output terminal 1612c and a control output terminal 1612d. The Wait object of symbol 1610 is used to pause the execution of the corresponding application program for a specified time interval, which is useful in slowing down visual up-dates, for example. The Wait object preferably has Interval and Cancel-Block properties, among others, and incorporates the ControlOut, DataReady, ErrorOut and Run-Block events. When the Wait object's control input terminal 1612a is triggered (i.e., changed), the object counts off the value of its Interval property. When the time corresponding to its Interval property elapses, the Wait object issues its DataReady event. While it counts off the interval, the object may repeatedly pass (e.g., fire) a busy value on data output terminal 1612b.

A Yield symbol 1614 preferably includes a control input terminal 1616. When added to a loop branch of a flow diagram, the Yield object of symbol 1614 pauses the execution of the respective loop upon each iteration (e.g., before each new DataReady event and loop index are issued by a For Loop object) so that other processes of the application program can be executed, as necessary. When these other processes have finished executing, processing continues with the next loop iteration. The Yield object preferably pauses the execution of the first up-stream loop object (e.g., Do Loop, For Loop or Timer objects) to which the symbolic representation of the given Yield object is connected.

A Stop symbol 1618 preferably has a control input terminal 1620. The Stop object corresponding to symbol 1618 stops the execution of the corresponding application program (not just the looping branch within which it may be located) when its control input property is triggered (e.g., changed). A comparison or any other object may be arranged within the corresponding flow diagram to trigger a Stop object upon the occurrence of some condition defined by the developer. It should be understood that a Stop object may be used in the flow diagram corresponding to any application program, not just one that includes a loop.

Those skilled in the art will recognize that other program objects with corresponding symbolic representations may be generated for use with the program-development environment 310 (FIG. 3) of the present invention. For example, program objects and constituent symbols may be created for reading text, data or arrays from a specified storage file and making that information available as an output to the data/control flow diagram, or for writing text, data or arrays received as an input from the data/control flow diagram to a specified file. Another object and symbol may be designed to retrieve the current time from the computer system and make it available, in one or more formats, as an output to the data/control flow diagram. A still further object and symbol placed within the data/control flow diagram may run a specified executable program upon being triggered. This object may have a property that, upon starting the executable program, allows the application program of the flow diagram to continue running substantially simultaneously with the execution of the specified executable program, or delay continued running of the application program until the specified executable program is finished executing.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A program development environment embodied on a computer readable medium for use with a computer having a screen to create an application program, the program development environment comprising:

a visual programming system having an extensibility object; and a graphical designer system configured to communicate with the visual programming system through the extensibility object, wherein the visual programming system and the graphical designer system cooperate to display on the screen (1) a toolbox having a plurality of icons, whereby each icon corresponds to a program object that can be selected by a user, and the program objects are configured to issue one or more respective events, (2) a form window configured to hold symbolic representations of instantiations of program objects whose corresponding icons have been selected from the toolbox, provided that the program objects have a graphical user interface element, (3) a designer window configured to hold symbolic representations of instantiations of all program objects whose corresponding icons have been selected from the tool box, and (4) a code window configured to accept textual inputs from the user, the user graphically defines event handler procedures within the designer window for selected instantiations of the program objects, and textually defines event handler procedures within the code window for one or more instantiations of the program objects, and the visual programming system and the graphical designer system cooperate to incorporate the instantiations of the program objects added to the designer window, and the event handler procedures that the user has defined graphically and textually into the application program being created.

2. The program development environment of claim 1 wherein the user graphically defines the event handler procedures within the designer window by linking selected symbolic representations of program object instantiations.

3. The program development environment of claim 2 wherein the visual programming system and the graphical designer system further cooperate to automatically add a symbolic representation to the form window, in response to the user adding a symbolic representation to the designer window.

4. The program development environment of claim 1 wherein the program objects are one of ActiveX and Component Object Model (COM) objects.

5. The program development environment of claim 1 wherein the graphically defined event handler procedures specify one of a data and control flow among the instantiations of the program objects within the designer window.

6. The program development environment of claim 1 wherein the visual programming system is one of Visual Basic, Visual C++, Visual J++, Visual Café, Visual InterDev and Delphi.

\* \* \* \* \*